(12) United States Patent
Kubota

(10) Patent No.: US 8,708,520 B2
(45) Date of Patent: Apr. 29, 2014

(54) ILLUMINATION DEVICE AND ELECTRONIC APPARATUS

(75) Inventor: Takehiko Kubota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 494 days.

(21) Appl. No.: 13/094,193

(22) Filed: Apr. 26, 2011

(65) Prior Publication Data

US 2011/0267813 A1 Nov. 3, 2011

(30) Foreign Application Priority Data

Apr. 30, 2010 (JP) ................................. 2010-104711
Apr. 30, 2010 (JP) ................................. 2010-104963

(51) Int. Cl.
*F21V 5/04* (2006.01)

(52) U.S. Cl.
USPC ........... 362/235; 362/335; 362/613; 362/244; 362/97.3; 362/97.1

(58) Field of Classification Search
USPC ............. 362/235, 237, 244, 335, 613; 349/69
See application file for complete search history.

(56) References Cited

U.S. PATENT DOCUMENTS

| | | | |
|---|---|---|---|
| 7,360,936 B2 * | 4/2008 | Abu-Ageel | 362/555 |
| 7,448,774 B2 | 11/2008 | Konuma | |
| 7,909,484 B2 * | 3/2011 | Rubtsov | 362/311.02 |
| 8,016,459 B2 * | 9/2011 | Cheng et al. | 362/311.02 |
| 8,047,699 B2 * | 11/2011 | Cheng et al. | 362/619 |
| 2007/0064147 A1 | 3/2007 | Kitamura et al. | |
| 2007/0064174 A1 | 3/2007 | Kitamura et al. | |
| 2010/0188858 A1 * | 7/2010 | Parker et al. | 362/335 |

FOREIGN PATENT DOCUMENTS

| | | |
|---|---|---|
| JP | A-2005-098926 | 4/2005 |
| JP | A-2007-87792 | 4/2007 |
| JP | A-2007-171319 | 7/2007 |
| JP | A-2009-087538 | 4/2009 |

* cited by examiner

*Primary Examiner* — Anabel Ton
(74) *Attorney, Agent, or Firm* — Oliff PLC

(57) ABSTRACT

An illumination device includes a light emitting element chip and a plurality of lens array units. The light emitting element chip has a plurality of light emitting elements. Each light emitting element is a first light emitting portion provided in the light emitting element chip, or is a second light emitting portion provided at a position closer to the end portion of the light emitting element chip than the first light emitting portion. The lens array unit has a plurality of micro lenses each of which is opposed to each of the plurality of light emitting elements. Each micro lens is a first lens opposed to the first light emitting portion, or a second lens opposed to the second light emitting portion. The optical center of the first lens coincides with the geometric center thereof, and the optical center of the second lens is different from the geometric center thereof.

16 Claims, 17 Drawing Sheets

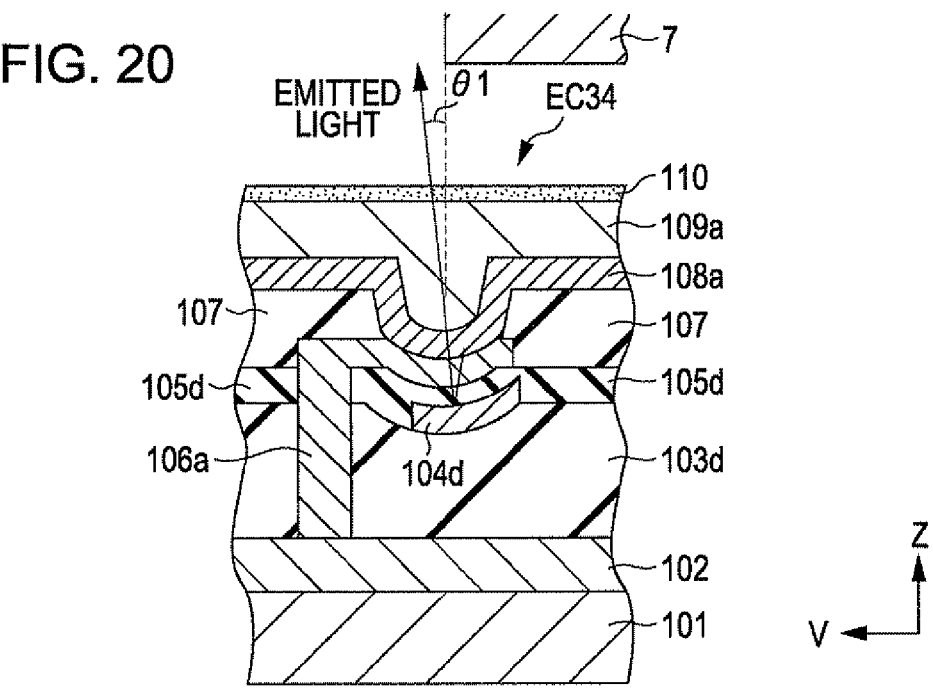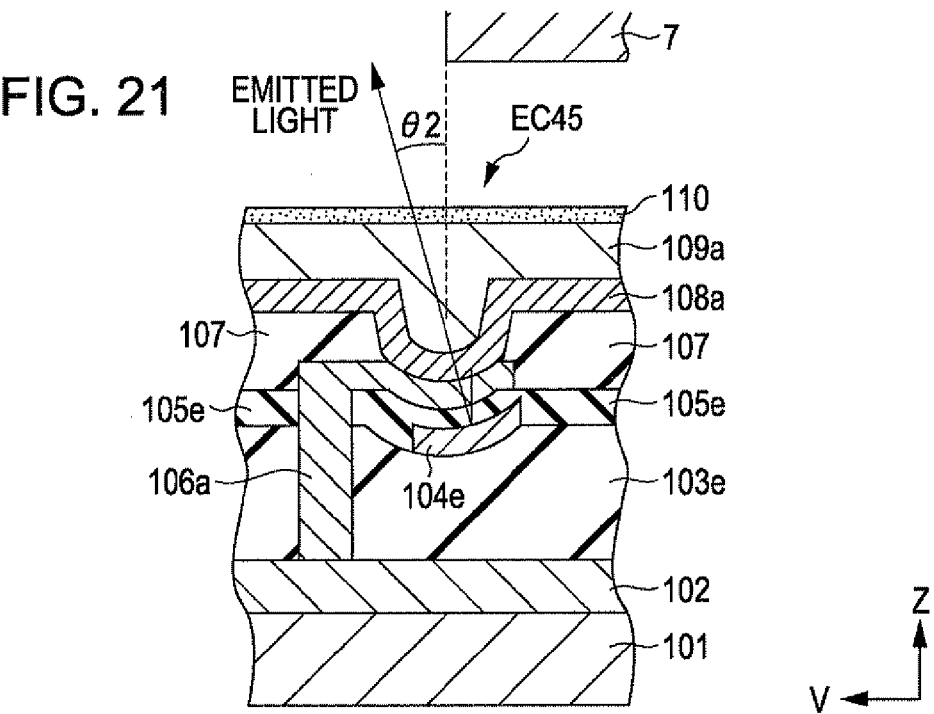

ILLUMINATION DEVICE AND ELECTRONIC APPARATUS

BACKGROUND

1. Technical Field

The present invention relates to an illumination device, which has a plurality of light emitting portions, and an electronic apparatus using the same.

2. Related Art

As illumination devices having a plurality of light emitting portions, there are known illumination devices which have a plurality of LED (Light Emitting Diode) elements and illumination devices that have a plurality of organic light emitting diode (Organic LED) elements, as described in JP-A-2007-87792 and JP-A-2007-171319. In such illumination devices, all the light emitting portions are arranged on a single substrate (a light emitting substrate), and thus the light emitted from the light emitting substrate passes through a light collection optical system, and reaches an illumination target surface.

In the technical fields thereof, in terms of effectively using illuminating light, there has been demand for an illumination device capable of illuminating a wider area. Accordingly, it is advantageous to illuminate a wider area by using the illumination device having a plurality of light emitting portions. However, in the illumination devices disclosed in JP-A-2007-87792 and JP-A-2007-171319, the irradiation area based on a single light emitting substrate is restricted so as to be narrow by the light collection optical system. That is, it is difficult to use the above-mentioned techniques in illuminating a wider area. Therefore, the first issue of the invention relates to a technique of widening the irradiation area based on a single light emitting substrate.

On the other hand, as a method of widening the irradiation area in the illumination device having the plurality of light emitting portions, there is a method of widening the area of the light emitting substrate. However, there is a limitation in widening the area of the light emitting substrate. As another method, there is a conceivable method of forming the illumination device by arranging a plurality of light emitting substrates. However, in this case, the illuminance of the area, which corresponds to the connection portion of the light emitting substrates, on the illumination target surface is drastically lower than the illuminance of the other area. Therefore, the second issue of the invention relates to a technique of illuminating the area corresponding to the connection portion of the light emitting substrates.

SUMMARY

That is, an advantage of some aspects of the invention is to provide an illumination device, which is capable of realizing at least one of the techniques of the above-mentioned first and second issues, and an electronic apparatus using the same.

According to a first aspect of the invention, an illumination device includes: a light emitting substrate that has a plurality of light emitting portions arranged thereon; and a lens array that has a plurality of lenses each of which is opposed to each of the plurality of light emitting portions and through which passes the light emitted from the opposed light emitting portions. The plurality of light emitting portions includes a first light emitting portion which is provided on the light emitting substrate and a second light emitting portion which is provided to be closer to an end portion of the light emitting substrate than the first light emitting portion. The plurality of lenses includes a first lens which is opposed to the first light emitting portion and a second lens which is opposed to the second light emitting portion. The optical center of the first lens coincides with the geometric center thereof. The optical center of the second lens is different from the geometric center thereof.

With such a configuration, by using a decentered lens (a lens of which the optical center is different from the geometric center thereof) as the second lens, it is possible to refract the light, which is emitted from the second light emitting portion, in the direction from the center of the array of the plurality of light emitting portions to the end thereof. In other words, it is possible to diffuse the light, which is emitted from the light emitting substrate, outward, that is, it is possible to illuminate the wider area. Accordingly, when the light emitting substrates are two-dimensionally arranged, it possible to illuminate the area, which corresponds to the connection portion of the light emitting substrates, on the illumination target surface. That is, it is possible to prevent the illuminance of the area, which corresponds to the connection portion of the plurality of light emitting substrates, on the illumination target surface from becoming drastically lower than the illuminance of the other area.

Furthermore, when the light emitted from the second light emitting portion is intended to be refracted in the direction, for example, it is preferable that, in the first light emitting portion and the first lens opposed to each other, the light emitting center of the first light emitting portion should coincide with an optical axis of the first lens. In addition, it is also preferable that the second lens should have a degree of eccentricity which is set to refract light emitted from the opposed second light emitting portion in a direction from a center of an array of the plurality of light emitting portions to an end thereof.

Further, according to a second aspect of the invention, an illumination device includes: a light emitting substrate that has a plurality of light emitting portions arranged thereon; and a lens array that has a plurality of lenses each of which is opposed to each of the plurality of light emitting portions of the light emitting substrate and through which passes the light emitted from the opposed light emitting portions. The plurality of light emitting portions includes a first light emitting portion which is provided on the light emitting substrate and a second light emitting portion which is provided to be closer to an end portion of the light emitting substrate than the first light emitting portion. The plurality of lenses includes a first lens which is opposed to the first light emitting portion and a second lens which is opposed to the second light emitting portion. In the first light emitting portion and the first lens opposed to each other, a light emitting center of the first light emitting portion coincides with an optical axis of the first lens. In the second light emitting portion and the second lens opposed to each other, a light emitting center of the second light emitting portion is deviated from an optical axis of the second lens.

With such a configuration, the second light emitting portion and the second lens opposed to each other are disposed such that the light emitting center of the second light emitting portion is deviated from the optical axis of the second lens. Thereby, it is possible to refract the light, which is emitted from the second light emitting portion, in the direction from the center of the array of the plurality of light emitting portions including the second light emitting portion to the end thereof. That is, it is possible to diffuse the light, which is emitted from the light emitting substrate, outward. Moreover, it is possible to use single type lenses (lenses of which the optical centers respectively coincide with the geometric centers thereof) arranged in the lens array. Hence, it becomes easy to manufacture the lens array.

Furthermore, when the light emitted from the second light emitting portion is intended to be refracted in the direction, for example, it is preferable that the optical center of each of the plurality of lenses should coincide with the geometric center thereof. In addition, it is also preferable that the second light emitting portion and the second lens opposed to each other should be disposed in a state where the light emitting center of the second light emitting portion is deviated from the optical axis of the second lens such that light emitted from the second light emitting portion is refracted in a direction from a center of an array of the plurality of light emitting portions to an end thereof.

Further, according to a third aspect of the invention, an illumination device includes: a light emitting substrate that has a plurality of light emitting portions arranged thereon; and a lens array that has a plurality of lenses each of which is opposed to each of the plurality of light emitting portions and through which passes the light emitted from the opposed light emitting portions. In each lens opposed to each of the plurality of light emitting portions, as a position of each opposed light emitting portion gets closer to an end of an array of the plurality of light emitting portions from a reference position thereof, an angle, at which the lens refracts light emitted from the opposed light emitting portion in a direction from the reference position to the end, increases.

With such a configuration, the light, which is emitted from the light emitting substrate, is diffused outward. Accordingly, this configuration has the same advantages as those of the illumination devices according to the aforementioned aspects. Further, the angle, at which each of the plurality of lenses refracts the light emitted from each light emitting portion opposed thereto, increases, as the position of the corresponding light emitting portion gets closer to the end of the array of the plurality of light emitting portions from the reference position thereof. This contributes to uniformity of illuminance on the illumination target surface. Furthermore, as the reference position, the center of the array of the plurality of light emitting portions can be exemplified. When the reference position is at the center of the array of the plurality of light emitting portions, the light emitted from the light emitting substrate is entirely diffused outward. Accordingly, when the light emitting substrates are two-dimensionally arranged, it is possible to illuminate the entire area, which includes the area corresponding to the connection portion of the light emitting substrates, on the illumination target surface.

Further, according to a fourth aspect of the invention, an illumination device includes: a light emitting substrate that has a plurality of light emitting portions arranged thereon; and a lens array that has a plurality of lenses each of which is opposed to each of the plurality of light emitting portions and through which passes the light emitted from the opposed light emitting portions. Each of the plurality of light emitting portions has a light emitting layer which produces light, a light reflective layer which reflects light produced from the light emitting layer, and a light emitting face from which the light reflected by the light reflective layer is emitted. The plurality of light emitting portions includes a first light emitting portion which is provided on the light emitting substrate and a second light emitting portion which is provided to be closer to an end portion of the light emitting substrate than the first light emitting portion. A direction of light emitted from the first light emitting portion coincides with a straight line which extends from the light emitting face of the first light emitting portion in a direction perpendicular to the light emitting face.

A direction of light emitted from the second light emitting portion is inclined with respect to a straight line which extends from the light emitting face of the second light emitting portion in a direction perpendicular to the light emitting face.

With such a configuration, it is possible to incline the traveling direction of the light, which is emitted from the second light emitting portion, with respect to the straight line, which extends from the light emitting face thereof, in the direction from the center of the array of the plurality of light emitting portions to the end thereof. In other words, it is possible to diffuse the light, which is emitted from the light emitting substrate, outward, that is, it is possible to illuminate the wider area. Accordingly, when the light emitting substrates are two-dimensionally arranged, it is possible to illuminate the area, which corresponds to the connection portion of the light emitting substrates, on the illumination target surface. That is, it is possible to prevent the illuminance of the area, which corresponds to the connection portion of the plurality of light emitting substrates, on the illumination target surface from becoming drastically lower than the illuminance of the other area.

Further, the illumination devices according to the aspects of the invention are used in various electronic apparatuses. A typical example of an electronic apparatus according to a fifth aspect of the invention is a liquid crystal device which includes the illumination device according to each aspect as the back light or the front light. The liquid crystal device includes not only the illumination device according to each aspect but also a plurality of liquid crystal elements arranged on the illumination target surface of the illumination device. It is apparent that the application of the illumination device according to each aspect of the invention is not limited to the back light or the front light of the liquid crystal device.

BRIEF DESCRIPTION OF THE DRAWINGS

The invention will be described with reference to the accompanying drawings, wherein like numbers reference like elements.

FIG. 20 is a sectional view illustrating a structure of the light emitting element.

FIG. 21 is a sectional view illustrating a structure of the light emitting element.

DESCRIPTION OF EXEMPLARY EMBODIMENTS

Figure 1:
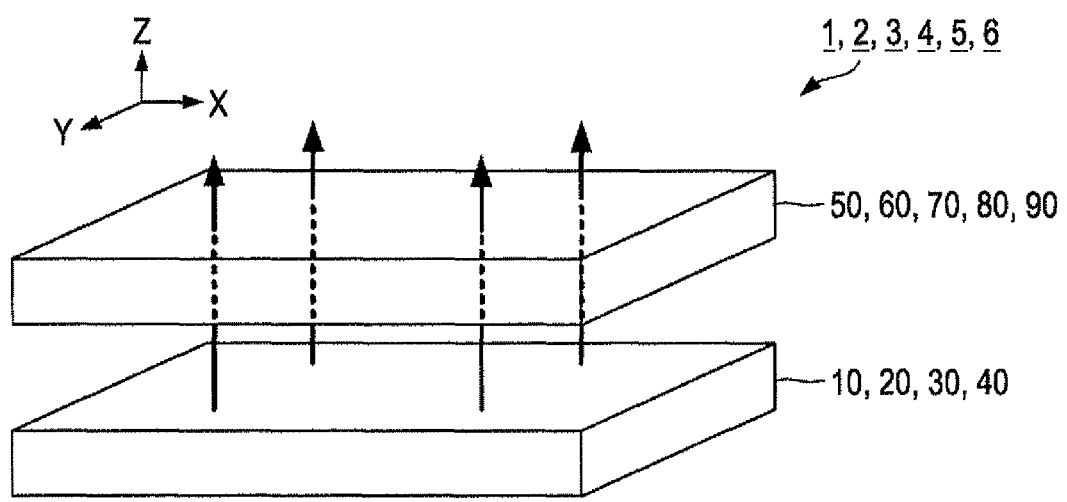
FIG. 1 is a perspective view illustrating an illumination device according to embodiments of the invention.

Hereinafter, embodiments of the invention will be described with reference to the accompanying drawings. It should be noted that, in the drawings, dimensions of the respective elements may not exactly reflect those in the actual situation.

FIG. 1 is a perspective view illustrating a configuration of the illumination devices 1 to 6 according to the first to sixth embodiments of the invention. As shown in FIG. 1, each of the illumination devices 1 to 6 includes a light emitting panel that extends in the X direction (the row direction) and the Y direction (the column direction), a lens array that overlaps with the light emitting panel in the Z direction (the vertical direction), and a power supply circuit (not shown in the drawing) that supplies current to light emitting portions to be described later. Specifically, the illumination device 1 includes a light emitting panel 10 and a lens array 50. The illumination device 2 includes the light emitting panel 10 and a lens array 60. The illumination device 3 includes the light emitting panel 10 and a lens array 70. The illumination device 4 includes a light emitting panel 20 and a lens array 80. The illumination device 5 includes a light emitting panel 30 and the lens array 80. The illumination device 6 includes a light emitting panel 40 and a lens array 90.

In each of the illumination device 1 to 3 the traveling direction of the light emitted from the light emitting portions is controlled through the lens array, thereby solving the above-mentioned problems. Specifically, in order to solve the above-mentioned problems, the illumination device 1 employs so-called decentered lenses; the illumination device 2 is configured such that the light emitting center of each light emitting portion is deviated from the optical axis of each lens; and the illumination device 3 is configured such that the light is refracted at an angle corresponding to the position of each lens. On the other hand, in each of the illumination devices 4 to 6, the traveling direction of the light emitted from the light emitting portions is controlled by the light emitting panel, thereby solving the above-mentioned problems. Specifically, in order to solve the above-mentioned problems, the illumination device 4 has a plurality of light emitting portions of which each shape of the light reflective layer is different; the illumination device 5 has a plurality of light emitting portions of which each angle of the light reflective layer to the light emitting layer is different; and the illumination device 6 is configured such that the direction of the light emitted from each light emitting portion is inclined at an angle corresponding to the position of the light emitting portion.

A. First Embodiment

First, the illumination device 1 according to a first embodiment will be described.

Figure 2:
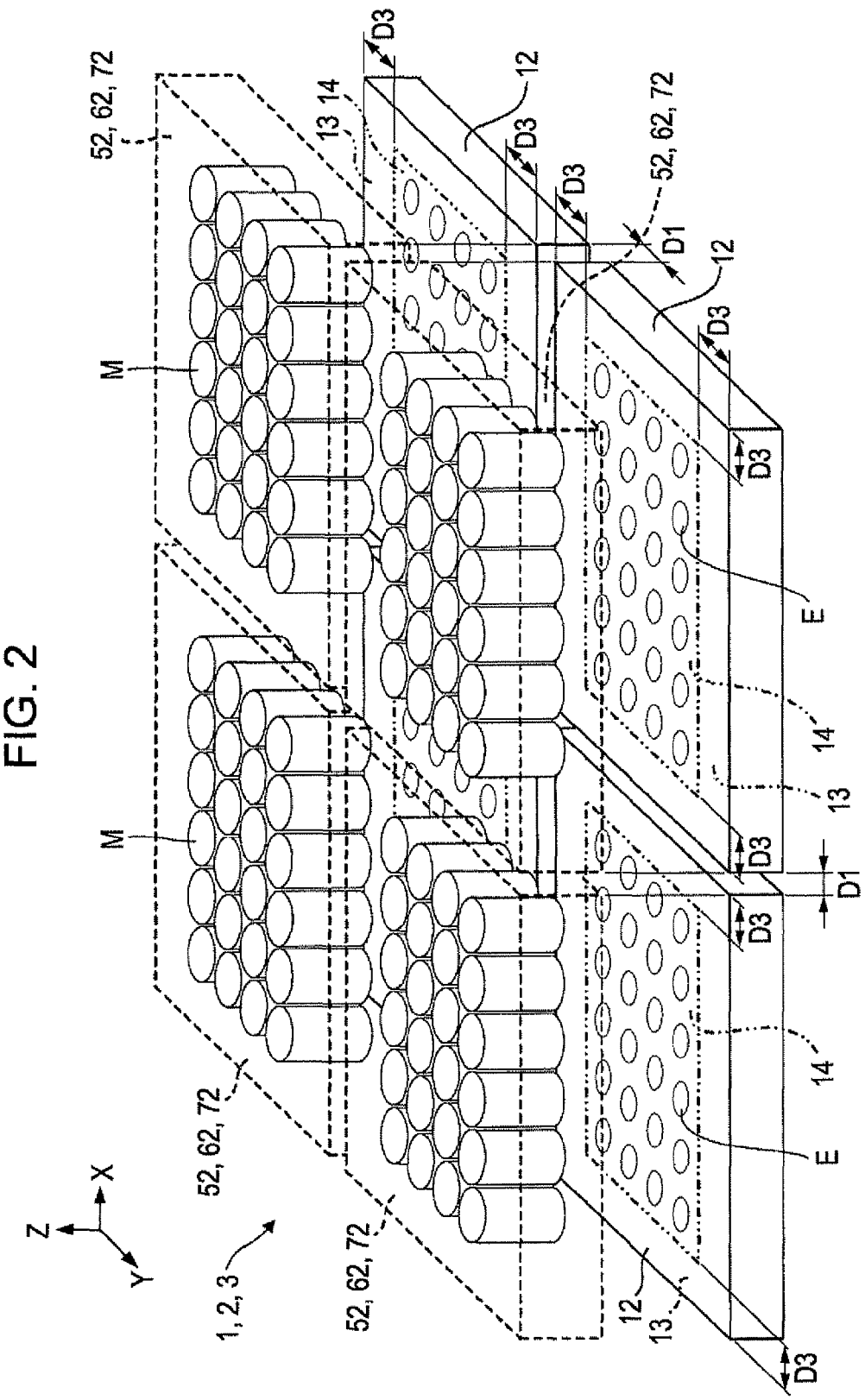
FIG. 2 is a perspective view illustrating a structure of the illumination device.

FIG. 2 is a perspective view illustrating a structure of the illumination devices 1 to 3. As shown in FIG. 2, the light emitting panel 10 of the illumination device 1 includes four rectangular light emitting element chips (light emitting substrates) 12. Such light emitting element chips 12 are arranged, as shown in FIG. 2, in 2 rows and 2 columns in the X and Y directions. It is preferable that the space D1 between the light emitting element chips 12 should be set to be as narrow as possible. Furthermore, the size of each light emitting element chip 12 is arbitrary, and as a material for forming a base substrate of the light emitting element chip 12, it is possible to employ various materials such as glass, silicon, metal, plastic, and ceramics. Further, the light emitting element chip 12 may use a flexible substrate.

In each light emitting element chip 12, 24 light emitting elements (light emitting portions) E, which has a circular light emitting face, are formed. Each light emitting element E is, for example, an organic light-emitting diode element, and emits light by current supply. Further, although not shown in the drawings, each light emitting element E has a light emitting layer that is formed of an organic EL (Electra Luminescent) material and the one electrode and the other electrode that are disposed with the light emitting layer interposed therebetween. Furthermore, each light emitting element E is covered by a sealing layer (not shown), in which the light originated from each light emitting element E is transmitted through the sealing layer and is emitted. For this reason, the sealing layer and the electrode on the sealing layer side are formed of a material with a high transmittance.

Further, a frame area 13 with the width D3 is provided at the ends of each light emitting element chip 12 in order to secure a tolerance margin at the time of cutting out the light emitting element chip 12 from an original substrate. The light emitting element E may not be disposed on the frame area 13. Hence, 24 light emitting elements E are arranged in 4 rows and 6 columns in the X and Y directions, in the light emitting area 14 surrounded by the frame area 13. The light emitting elements E and the light emitting element chips 12 are arranged such that a total of 96 light emitting faces are coplanar.

On the other hand, the lens array 50 of the illumination device 1 includes four lens array units 52. As shown in FIG. 2, each lens array unit 52 is disposed to face the light emitting element chip 12, and has a tabular base formed of an optically transparent material (for example, glass) as indicated by the dashed line. Further, 24 circular lens portions are formed on each surface opposite the surface of the base close to the light emitting element chip 12, and two lens portions, which are opposed to each other with the base interposed therebetween, and the base, which is present between both of them, constitutes one micro lens (a lens) M. That is, the lens array unit 52 has 24 biconvex lenses.

In each lens array unit 52, 24 micro lenses M are provided at positions at which the lenses are respectively opposed to the 24 light emitting elements E included in the opposed light emitting element chip 12. That is, such micro lenses M are arranged in 4 rows and 6 columns in the X and Y directions, and the light emitted from each light emitting element E passes (is transmitted) through the micro lens M opposed thereto.

Further, although not shown in the drawings, a spacer for keeping the distance between the light emitting element chip 12 and the lens array unit 52 constant is disposed between the light emitting element chip 12 and the lens array unit 52. The spacer has 24 through-holes that are formed to make the light, which is emitted from each light emitting element E, incident to each micro lens M opposed thereto. Further, the spacer is formed of a material having a light blocking effect. Thus, the spacer prevents the light, which originates from the light emitting element E, from being incident to the micro lenses M which are not opposed to the light emitting element E.

Figure 3:
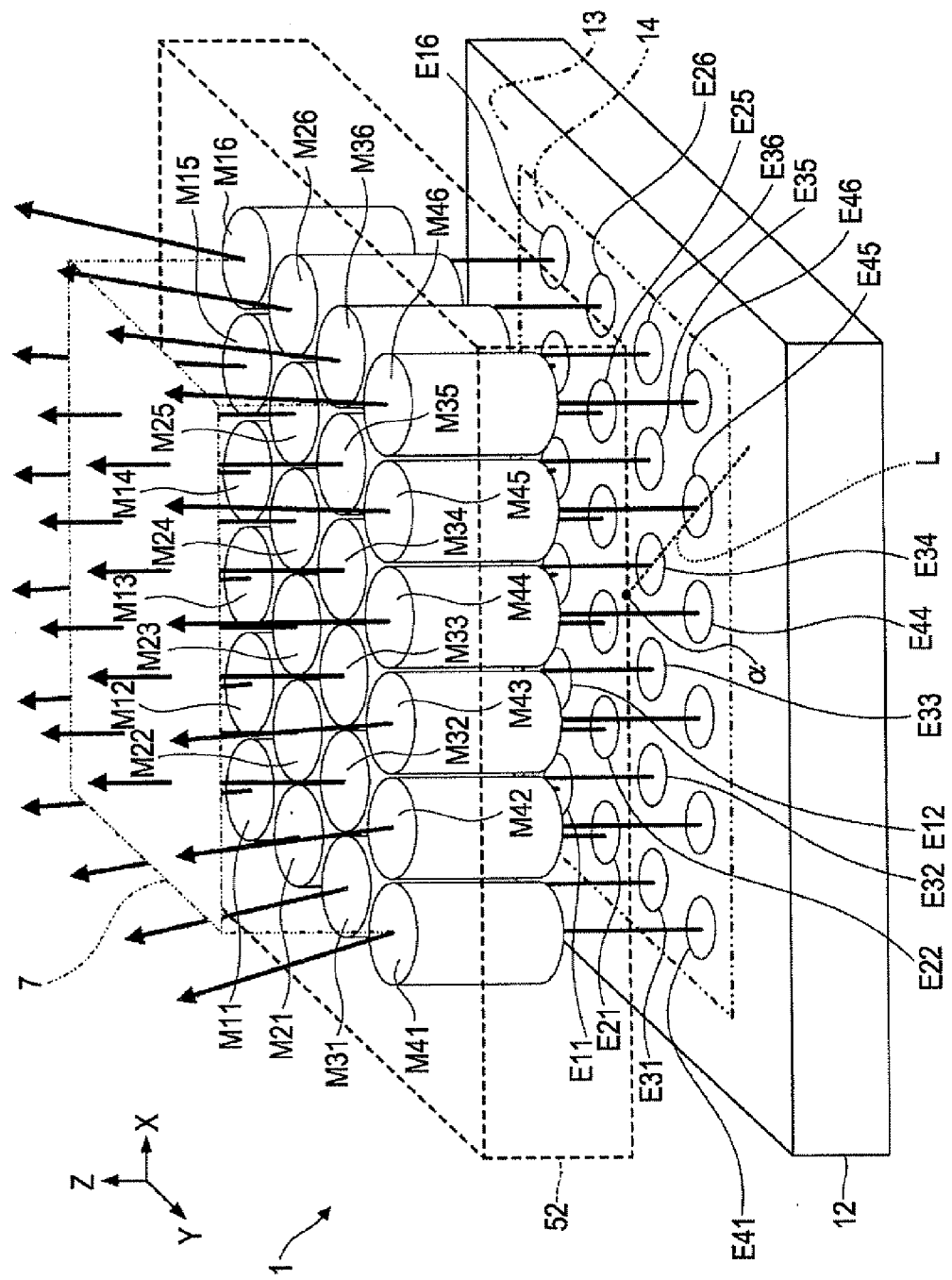
FIG. 3 is a perspective view illustrating a partial structure of the illumination device.

FIG. 3 is a perspective view illustrating a partial structure of the illumination device 1. As shown in the drawing, the 24 light emitting elements E included in the light emitting element chip 12 includes a light emitting element E11 in the first row and the first column, a light emitting element E11 in the first row and the second column, . . . , and the light emitting element E46 in the fourth row and the sixth column. Likewise, 24 micro lenses M included in the lens array unit 52 includes a micro lens M11 in the first row and the first column, a micro lens M12 in the first row and the second column, . . . , and a micro lens M46 in the fourth row and the sixth column. Assuming that i is a natural number of 4 or less and j is a natural number of 6 or less, the light emitting element Eij in the i-th row and the j-th column is opposed to the micro lens Mij in the i-th row and the j-th column.

The light emitting elements E22 to E25 and E32 to E35 are the 8 first light emitting portions which are disposed at the center portion of the light emitting area 14. In addition, the light emitting elements E11 to E16, E21, E26, E31, E36, and E41 to E46 are the 16 second light emitting portions which are disposed at the end portion of the light emitting area 14 along the four edges of the light emitting element chip 12. In other words, each of the 8 light emitting portions, which are provided at a position far from the end portion of the light emitting element chip 12, is the first light emitting portion, and each of the 16 light emitting portions, which are provided at a position close to the corresponding end portion, is the second light emitting portion.

The micro lenses M22 to M25 and M32 to M35 are the 8 first lenses opposed to the first light emitting portions. Each first lens is a lens (non-decentered lens) of which the optical center coincides with the geometric center, and is disposed such that the center axis thereof is set in the Z direction. Further, the micro lenses M11 to M16, M21, M26, M31, M36, and M41 to M46 are the 16 second lenses which are opposed to the second light emitting portions. Each second lens is a lens (decentered lens) of which the optical center is different from the geometric center.

The imaginary plane 7 is an imaginary rectangular plane for facilitating the understanding of the indication of the traveling direction of the light, and extends in the X and Y direction. The four corners of the imaginary plane 7 respectively overlap with the light emitting centers of the light emitting elements E11, E16, E41, and E46. The half line L is a straight line which defines the section of the illumination device 1, as shown in FIG. 3, extends in the V direction from the center (the center of the array of the light emitting elements E11 to E46) α of the light emitting area 14 as a starting point, and passes through the light emitting center of the light emitting element E34 and the light emitting center of the light emitting element E45.

Figure 4:
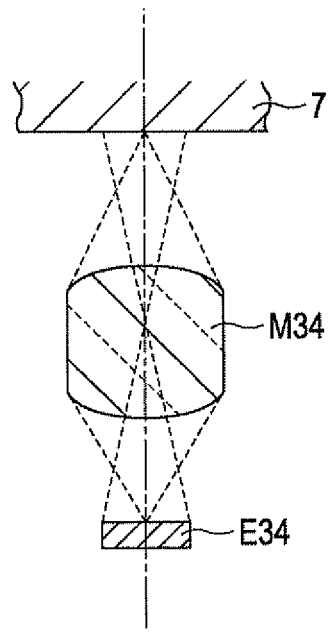
FIG. 4 is a sectional view illustrating a relationship between a light emitting element and a micro lens.

FIG. 4 is a sectional view illustrating a relationship between the light emitting element E34 and the micro lens M34, and shows a case where the illumination device 1 is cut along a plane including the half line L in parallel with the Z direction. As shown in FIG. 4, the light emitting element E34 and the micro lens M34 are opposed to each other such that the light emitting center of the light emitting element E34 coincides with the optical axis of the micro lens M34. The optical axis of the micro lens M34 is a straight line that connects the centers of the two lens portions constituting the micro lens M34. Through the micro lens M34, the light, which is emitted from the light emitting element E34 and incident to the lower-side lens portion in the drawing, exits from the upper-side lens portion in the drawing. Since the micro lens M34 is a non-decentered lens, the light, which is emitted from the light emitting element E34, passes through the micro lens M34 without change in the traveling direction thereof, and passes through the imaginary plane 7. Furthermore, the first lens represented by the micro lens M34 as an example is a gradient index lens having a cylindrical shape. In the cross section thereof, the refractive index may be low at the center axis (the optical axis), and the refractive index may be higher at the position farther from the center axis.

The arrangement relationship between each of the first light emitting portions (the light emitting elements E22 to E25, E32, E33, and E35) other than the light emitting element E34 and each of the first lenses (the micro lenses M22 to M25, M32, M33, and M35) other than the micro lens M34 are the same as the arrangement relationship between the light emitting element E34 and the micro lens M34. Accordingly, all the light, which is emitted from the 8 first light emitting portions (light emitting element E22 to E25 and E32 to E35), passes through the imaginary plane 7.

Figure 5:
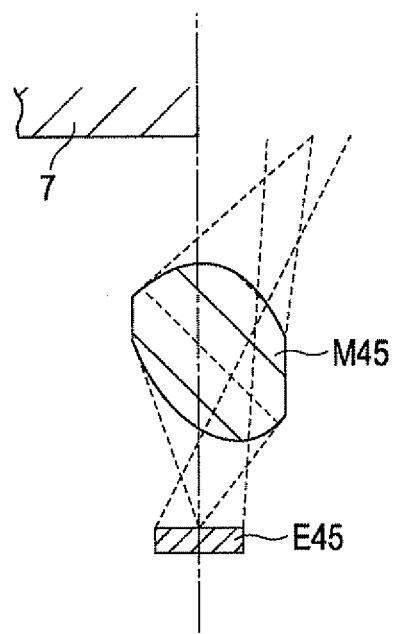
FIG. 5 is a sectional view illustrating a relationship between a light emitting element and a micro lens.

FIG. 5 is a sectional view illustrating a relationship between the light emitting element E45 and the micro lens M45, and shows a case where the illumination device 1 is cut along a plane including the half line L in parallel with the Z direction. As shown in FIG. 5, the micro lens M45 is a decentered lens, and the degree of eccentricity thereof is set such that the traveling direction of the light, which is emitted from the light emitting element E45, is refracted in the direction (the direction in which the light passes through the light emitting center of the light emitting element E45) from the center α of the light emitting area 14 to the end thereof. Accordingly, the light, which is emitted from the light emitting element E45 and passes the micro lens M45, does not pass through the imaginary plane 7, but passes through the outside of the imaginary plane 7. Furthermore, the center α of the light emitting area 14 is also the center of the array of the 24 light emitting elements E provided in the light emitting area 14. In addition, the end of the light emitting area 14 is also the end of the array of the 24 light emitting elements E provided in the light emitting area 14.

The arrangement relationship between each of the second light emitting portions (the light emitting elements E11 to E16, E21, E26, E31, E36, E41 to E44, and E46) other than the light emitting element E45 and each of the second lenses (the micro lens M11 to M16, M21, M26, M31, M36, M41 to M44, and M46) other than the micro lens M45 is the same as the arrangement relationship between the light emitting element E45 and the micro lens M45. Accordingly, the light, which is emitted from the 16 second light emitting portions (the light emitting elements E11 to E16, E21, E26, E31, E36, and E41 to E46), is refracted in the direction (the direction in which the light passes the light emitting center of the corresponding second light emitting portion) from the center α of the light emitting area 14 to the end thereof. Hence, no light passes through the imaginary plane 7, but passes through the outside of the imaginary plane 7.

As described above, according to the first embodiment, each lens array unit 52 employs the decentered lens in each of the 16 second lenses surrounding the 8 first lenses. Thereby, the light, which is emitted from each of the 16 second light emitting portions opposed to each of the 16 second lenses, is in the direction (the direction in which the light passes the light emitting center of the corresponding second light emitting portion) from the center α of the light emitting area 14 of the light emitting element chip 12, which is opposed to the corresponding lens array unit 52, to the end thereof. Hence, it is possible to entirely diffuse the light, which is emitted from each light emitting element chip 12, outside the corresponding light emitting element chip 12.

Accordingly, as an advantage corresponding to the first issue of the invention, it is possible to irradiate a wider area by using the single light emitting element chip 12.

In addition, as an advantage corresponding to the second issue of the invention, it is possible to illuminate the entire area, which includes the area corresponding the connection portion of the four light emitting element chips 12, on the illumination target surface. As a result, the luminance of the entire area, which includes the area corresponding to the connection portion of the light emitting substrates, on the illumination target surface increases, and thus the difference between the luminance of the area and the luminance of the other area decreases. Hence, it is possible to achieve uniformity of the luminance on the illumination target surface.

Furthermore, as both the space D1 and the width D3 in FIG. 2 are approximate to zero, even when the non-decentered lenses are used as the second lenses, it is possible to achieve uniformity of the luminance on the illumination target surface. However, the width D3 is necessary to secure a tolerance margin at the time of cutting out the light emitting element chip 12 from the original substrate, and thus it is difficult to set the width D3 to zero. In contrast, in the first embodiment, even when the width D3 is secured to have only a length sufficient to cut out the light emitting element chip 12, it is possible to achieve uniformity of the luminance on the illumination target surface.

B. Second Embodiment

Next, the illumination device 2 according to a second embodiment will be described. Furthermore, in the second embodiment, the elements common to the first embodiment will be represented by the same reference numerals and signs, and a detailed description thereof will be appropriately omitted.

Figure 6:
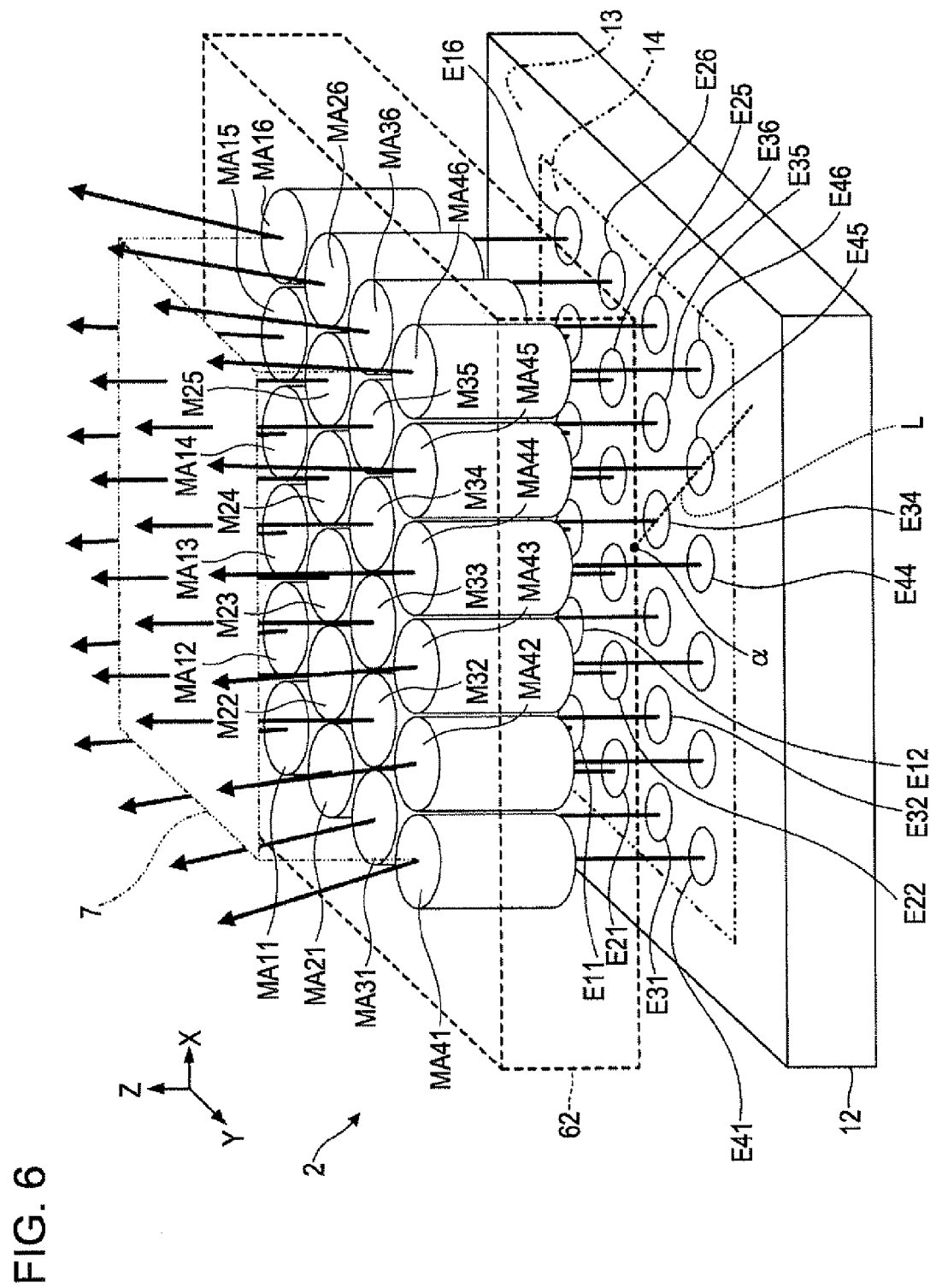
FIG. 6 is a perspective view illustrating a partial structure of the illumination device.

FIG. 6 is a perspective view illustrating a partial structure of the illumination device 2 according to the second embodiment. The illumination device 2 includes a lens array 60 instead of the lens array 50, and the lens array 60 includes a lens array unit 62 instead of the lens array unit 52. The lens array unit 62 includes the micro lenses MA11 to MA16, MA21, MA26, MA31, MA36, and MA41 to MA46 as 16 second lenses. All the 16 micro lenses M are non-decentered lenses.

Figure 7:
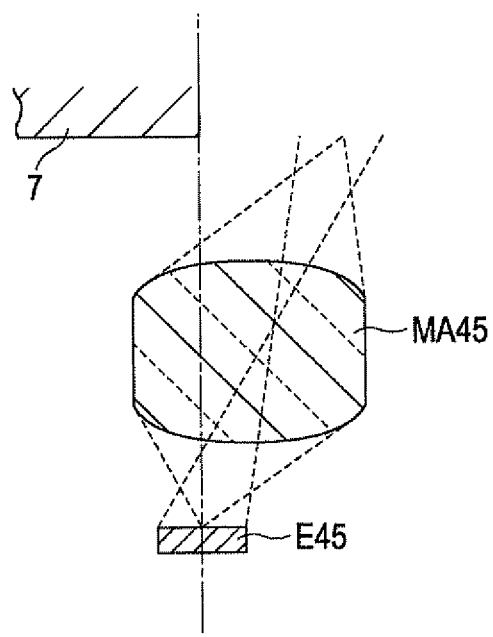
FIG. 7 is a sectional view illustrating a relationship between a light emitting element and a micro lens.

FIG. 7 is a sectional view illustrating a relationship between the light emitting element E45 and the micro lens MA45, and shows a case where the illumination device 2 is cut along a plane including the half line L in parallel with the Z direction. As shown in FIG. 7, the micro lens MA45 is disposed such that the optical axis of the lens is deviated from the light emitting center of the light emitting element E45. Specifically, the optical axis of the micro lens MA45 is deviated from the light emitting center of the light emitting element E45 in the direction (the direction in which the light passes through the light emitting center of the light emitting element E45) from the center α of the light emitting area 14 to the end thereof. Hence, the micro lens MA45 is able to refract the traveling direction of the light, which is emitted from the light emitting element E45, in the above-mentioned direction. Accordingly, the light, which is emitted from the light emitting element E45 and passes the micro lens MA45, does not pass through the imaginary plane 7, but passes through the outside of the imaginary plane 7.

The arrangement relationship between each of the second light emitting portions (the light emitting elements E11 to E16, E21, E26, E31, E36, E41 to E44, and E46) other than the light emitting element E45 and each of the second lenses (the micro lens MA11 to MA16, MA21, MA26, MA31, MA36, MA41 to MA44, and MA46) other than the micro lens M45 is the same as the arrangement relationship between the light emitting element E45 and the micro lens MA45. Accordingly, the light, which is emitted from the 16 second light emitting portions (the light emitting elements E11 to E16, E21, E26, E31, E36, and E41 to E46), is refracted, in terms of the traveling direction thereof, in the direction (the direction in which the light passes through the light emitting center of the corresponding second light emitting portion) from the center α of the light emitting area 14 to the end thereof. Hence, no light passes through the imaginary plane 7, but passes through the outside of the imaginary plane 7.

As described above, according to the second embodiment, in each lens array unit 62, each of the 16 second lenses surrounding the 8 first lenses is disposed such that the optical axis of the corresponding second lens is deviated from the light emitting center of the second light emitting portion opposed to the corresponding second lens in the direction from the center α of the light emitting area 14 of the light emitting element chip 12, which is opposed to the corresponding lens array unit 62, to the end thereof. Thereby, the light, which is emitted from each of the 16 second light emitting portions opposed to each of the 16 second lenses, is refracted in the above-mentioned direction. Hence, it is possible to entirely diffuse the light, which is emitted from each light emitting element chip 12, outside the corresponding light emitting element chip 12. Accordingly, the embodiment exhibits the same effect as the first embodiment. Further, in the second embodiment, the micro lenses M arranged in the lens array 60 is limited to a single type (the non-decentered lens of which the optical center coincides with the geometric center thereof). That is, the second embodiment has an advantage in that it is easy to manufacture the lens array.

C. Third Embodiment

Next, the illumination device 3 according to a third embodiment will be described. Furthermore, in the third embodiment, the elements common to the first embodiment will be represented by the same reference numerals and signs, and a detailed description thereof will be appropriately omitted.

Figure 8:
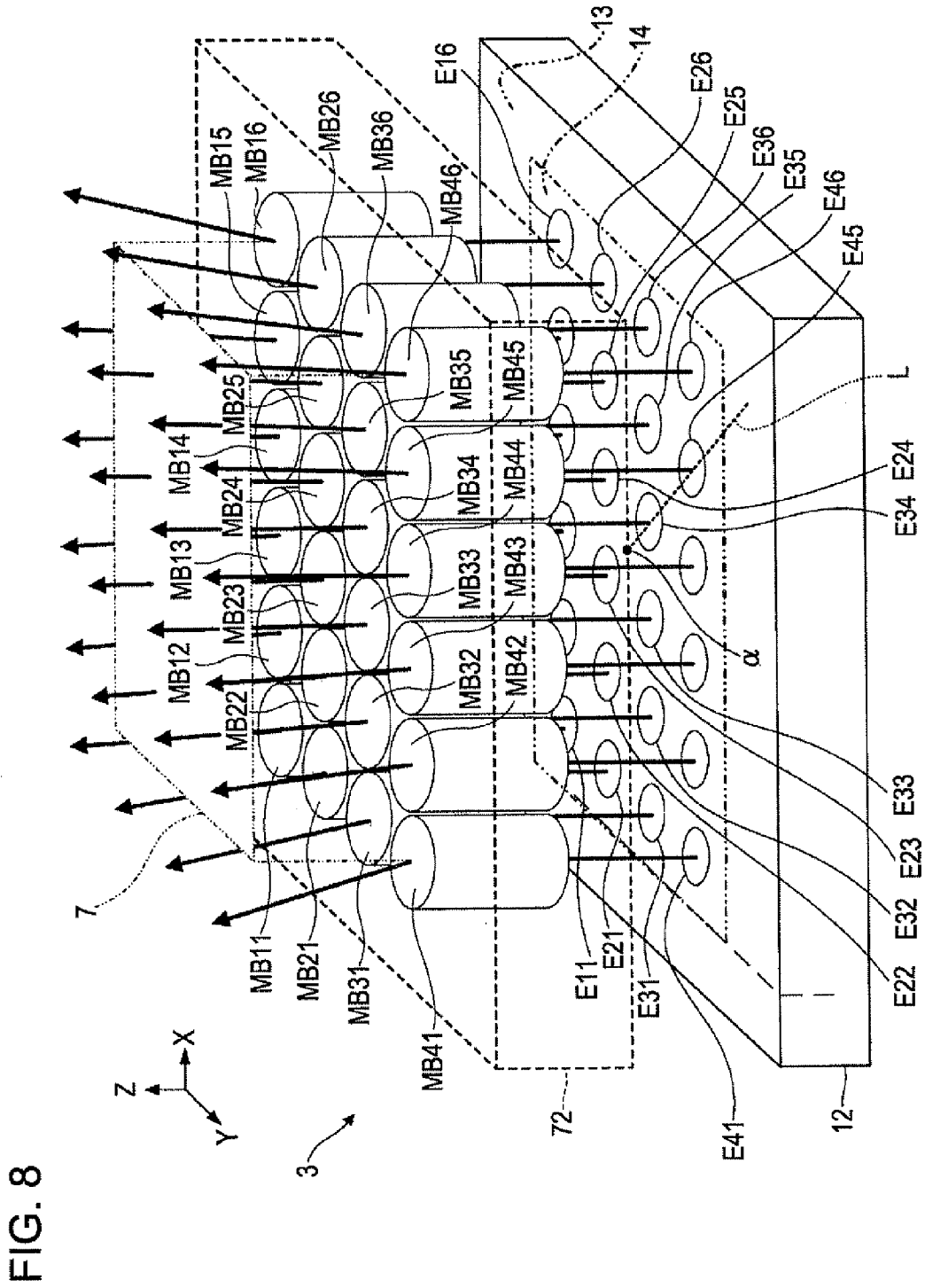
FIG. 8 is a perspective view illustrating a partial structure of the illumination device.

FIG. 8 is a perspective view illustrating a partial structure of the illumination device 3 according to the third embodiment. The illumination device 3 includes a lens array 70 instead of the lens array 50, and the lens array 70 includes a lens array unit 72 instead of the lens array unit 52. The lens array unit 72 includes the micro lenses MB11 to MB46 instead of the micro lenses M11 to M46. All the micro lenses MB11 to MB46 are non-decentered lenses.

Figure 9:
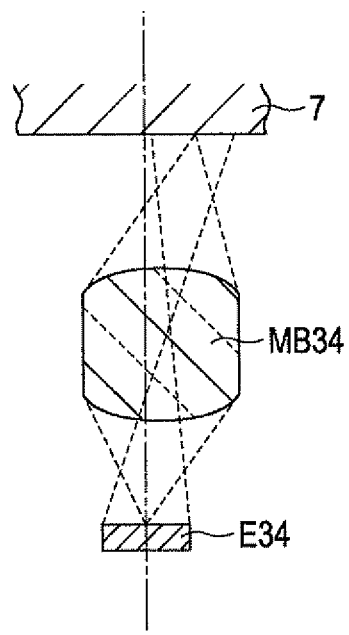
FIG. 9 is a sectional view illustrating a relationship between a light emitting element and a micro lens.
Figure 10:
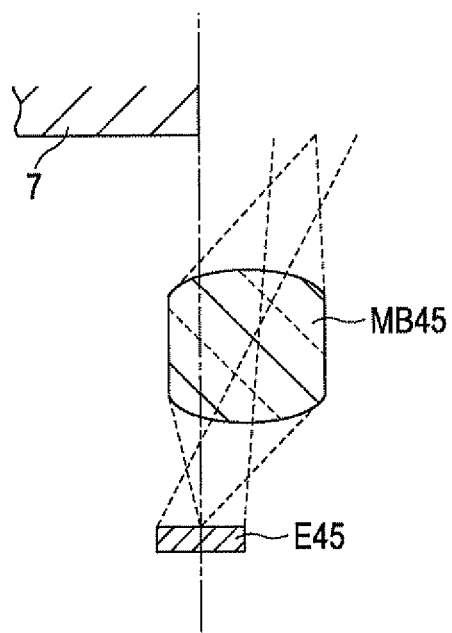
FIG. 10 is a sectional view illustrating a relationship between a light emitting element and a micro lens.

FIG. 9 is a sectional view illustrating a relationship between the light emitting element E34 and the micro lens MB34, and FIG. 10 is a sectional view illustrating a relationship between the light emitting element E45 and the micro lens MB45. Both of them show cases where the illumination device 3 is cut along a plane including the half line L in parallel with the Z direction. As shown in FIG. 9 (FIG. 10), the micro lens MB34 (MB45) is disposed such that the optical axis of the lens is deviated from the light emitting center of the light emitting element E34 (E45). Specifically, the optical axis of the micro lens MB34 (MB45) is deviated from the light emitting center of the light emitting element E34 (E45) in the direction (the direction in which the light passes the light emitting center of the light emitting element E34 (E45)) from the center α of the light emitting area 14 to the end thereof. Hence, the micro lens MB34 (MB45) is able to refract the traveling direction of the light, which is emitted from the light emitting element E34 (E45), in the above-mentioned direction.

Further, each of the micro lenses MB11 to MB46 is disposed such that the angle, at which the lens refracts the traveling direction of the light emitted from the light emitting element E opposed thereto, increases as the position of the opposed light emitting element E gets closer to the end of the light emitting area 14 from the center α thereof. Specifically, each of the micro lenses MB11 to MB46 is disposed such that the amount of deviation between the light emitting center of the opposed light emitting element E and the optical axis of the lens increases as the position of the opposed light emitting element E gets closer to the end of the light emitting area 14 from the center α thereof. For example, the amount of deviation between the optical axis of the micro lens MB45 and the light emitting center of the light emitting element E45 is larger than the amount of deviation between the optical axis of the micro lens MB34 and the light emitting center of the light emitting element E34.

Accordingly, it is possible to diffuse outward the light, which is emitted from the 24 light emitting portions (the light emitting elements E) provided in the light emitting area 14 of each light emitting element chip 12, through the lens array unit 72 opposed to the corresponding light emitting element chip 12. As shown in FIG. 8, the degree of diffusion increases as the distance between the light emitting portion and the center α of the light emitting area 14 becomes longer. Further, the light, which is emitted from the outermost 16 second light emitting portions (the light emitting elements E11 to E16, E21, E26, E31, E36, and E41 to E46), does not pass through the imaginary plane 7, but passes through the outside of the imaginary plane 7.

Furthermore, in the embodiment, the micro lenses MB11 to MB46 are disposed such that the light, which is emitted from the light emitting elements E11 to E16, E21, E26, E31, E36, and E41 to E46, does not pass through the imaginary plane 7, and the light, which is emitted from the light emitting elements E22 to E25 and E32 to E35, passes through the imaginary plane 7. However, the invention is not limited to this. For example, the micro lenses MB11 to MB46 may be disposed such that the light, which is emitted from the light emitting elements E11 to E16, E21, E22, E25, E26, E31, E32, E35, E36, and E41 to E46, does not pass through the imaginary plane 7, and the light, which is emitted from the light emitting elements E23, E24, E33, and E34, passes through the imaginary plane 7.

As described above, according to the third embodiment, in each lens array unit 72, the angle, at which each of the 24 micro lenses M refracts the light emitted from the opposed light emitting element E in the direction from the center α of the light emitting area 14 of the light emitting element chip 12 opposed to the corresponding lens array unit 72 to the end thereof, increases as the position of the corresponding micro lens M gets closer to the end of the light emitting area 14 from the center α thereof. Hence, it is possible to entirely diffuse the light, which is emitted from each light emitting element chip 12, outside the corresponding light emitting element chip 12. Accordingly, the embodiment exhibits the same effect as the first embodiment. Further, since the angle of refraction through each micro lens M is set as described above, it is possible to make the illuminance on the illumination target surface more uniform. Further, similarly to the second embodiment, the micro lenses M arranged in the lens array 70 is limited to a single type. That is, the third embodiment has an advantage in that it is easy to manufacture the lens array.

Furthermore, as the micro lenses MB11 to MB46, the decentered lens may be employed. In this case, the degree of eccentricity of each lens increases as the position of the opposed light emitting portion gets closer to the end of the light emitting area 14 from the center α thereof. Even in this case, in each lens array unit 72, the angle, at which each of the 24 lenses refracts the light emitted from the opposed light emitting portion in the direction from the center α of the light emitting area 14 of the light emitting element chip 12 opposed to the corresponding lens array unit 72 to the end thereof, increases as the position of the corresponding lens gets closer to the end of the light emitting area 14 from the center α thereof. Hence, this case exhibits the same effect as the case of employing the non-decentered lenses.

D. Fourth Embodiment

Next, the illumination device 4 according to a fourth embodiment will be described. Furthermore, in the embodiment, the elements common to the first embodiment will be represented by the same reference numerals and signs, and a detailed description thereof will be appropriately omitted.

Figure 11:
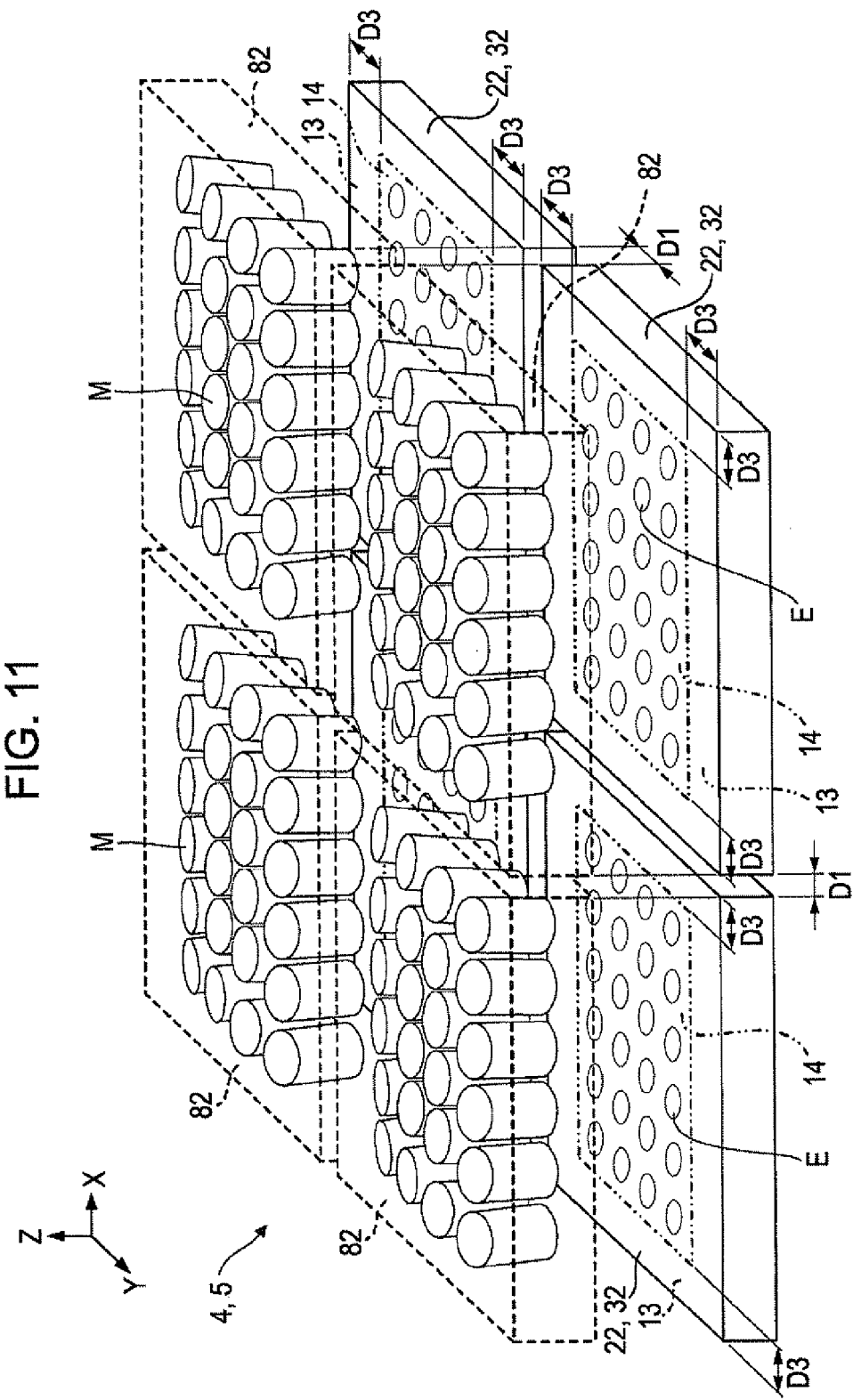
FIG. 11 is a perspective view illustrating a structure of the illumination device.

FIG. 11 is a perspective view illustrating a structure of the illumination devices 4 and 5. As shown in FIG. 11, the light emitting panel 20 of the illumination device 4 includes four rectangular light emitting element chips (light emitting substrates) 22. Such light emitting element chips 22 are arranged, similarly to the light emitting element chips 12, in 2 rows and 2 columns in the X and Y directions. Further, each light emitting element chip 22 has, similarly to the light emitting element chip 12, 24 light emitting elements E which are arranged in 4 rows and 6 columns in the X and Y directions. However, the direction of light, which is emitted from the 64 light emitting elements E among the 96 light emitting elements E included in the illumination device 4, is inclined with respect to the Z axis.

On the other hand, the lens array 80 of the illumination device 4 includes four lens array units 82. As shown in FIG. 11, each lens array unit 82 is disposed to face the light emitting element chip 22, and has a tabular base formed of an optically transparent material (for example, glass) as indicated by the dashed line. The lens array unit 82 has, similarly to the lens array unit 52, the 24 micro lenses M which are arranged in 4 rows and 6 columns in the X and Y directions. However, all the 96 micro lenses M included in the illumination device 4 are non-decentered lenses, and the optical axes of the 64 micro lenses M among such micro lenses M are inclined with respect to the Z axis. Therefore, the light, which is emitted from each light emitting element E, passes through the micro lenses M opposed thereto.

Figure 12:
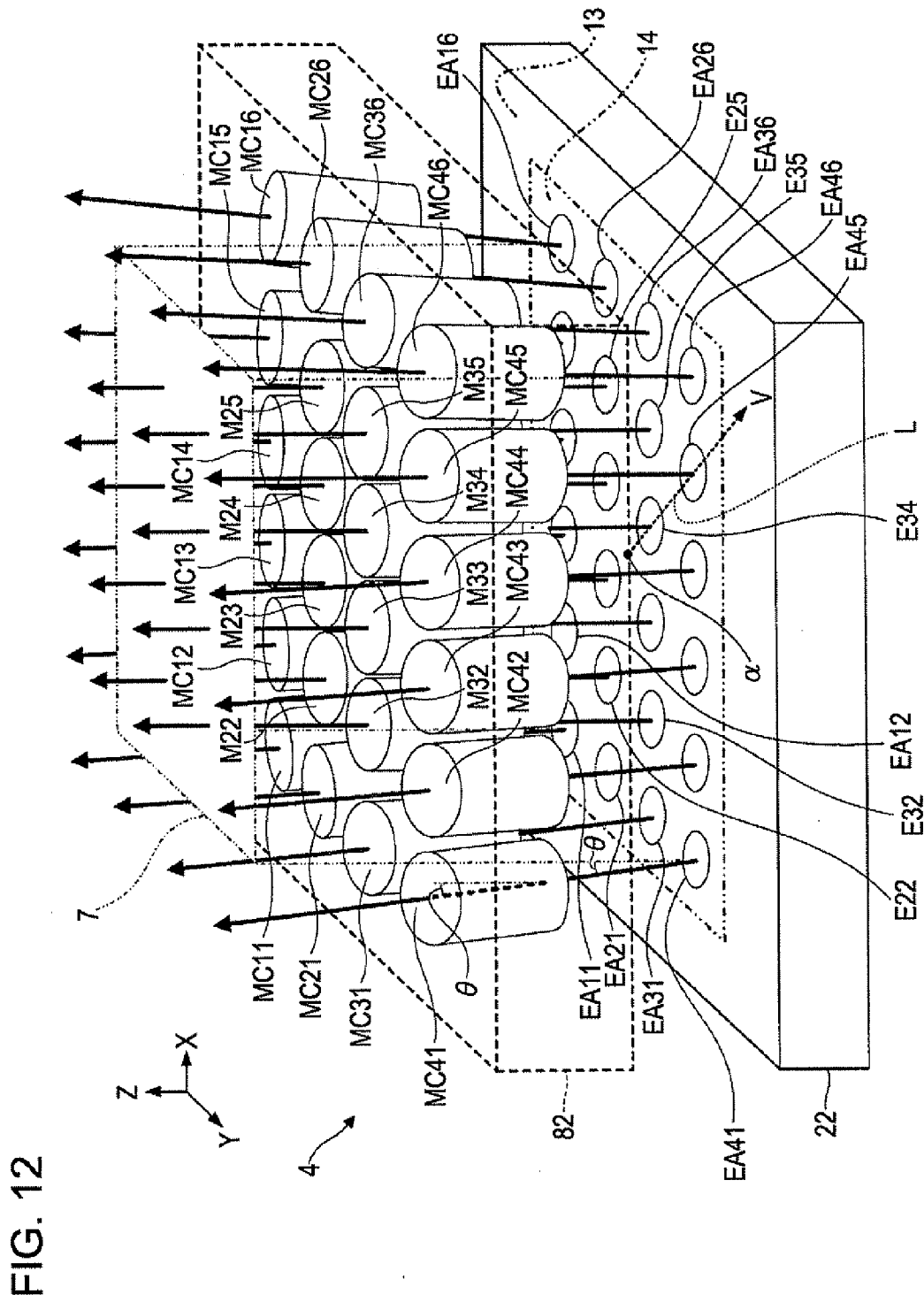
FIG. 12 is a perspective view illustrating a partial structure of the illumination device.

FIG. 12 is a perspective view illustrating a partial structure of the illumination device 4.

As shown in FIG. 12, each lens array unit 82 has, as 8 first lenses, the micro lenses M22 to M25 and M32 to M35 similarly to the lens array unit 52, and has, as 16 second lenses, the micro lenses MC11 to MC16, MC21, MC26, MC31, MC36, and MC41 to MC46. The micro lenses M22 to M25 and M32 to M35 are disposed such that each optical axis thereof is set in the Z direction. In contrast, the micro lenses MC11 to MC16, MC21, MC26, MC31, MC36, and MC41 to MC46 are disposed such that each optical axis thereof is inclined at an angle θ to the Z axis.

On the other hand, each light emitting element chip 22 has, as 8 first light emitting portions, the light emitting elements E22 to E25 and E32 to E35 similarly to the light emitting element chip 12, and has, as the 16 second light emitting portions, the light emitting elements EA11 to EA16, EA21, EA26, EA31, EA36, and EA41 to EA46. The direction of the light, which is emitted from each of the light emitting elements E22 to E25 and E32 to E35, is the Z direction. In contrast, the direction of the light, which is emitted from each of the light emitting elements EA11 to EA16, EA21, EA26, EA31, EA36, and EA41 to EA46, is inclined at the angle θ to the Z axis in the V direction.

The optical axes of the micro lens MC11 to MC16, MC21, MC26, MC31, MC36 and MC41 to MC46, respectively coincide with the directions of the light which is emitted from the light emitting element EA11 to EA16, EA21, EA26, EA31, EA36, and EA41 to EA46. That is, in the illumination device 4, the optical axis of each second lens coincides with the direction of the light which is emitted from the second light emitting portion opposed to the corresponding second lens. Further, in the illumination device 4, the second lens and the second light emitting portion opposed to each other are disposed such that the light emitting center of the second light emitting portion is located at the position to which the optical axis of the second lens extends.

Figure 13:
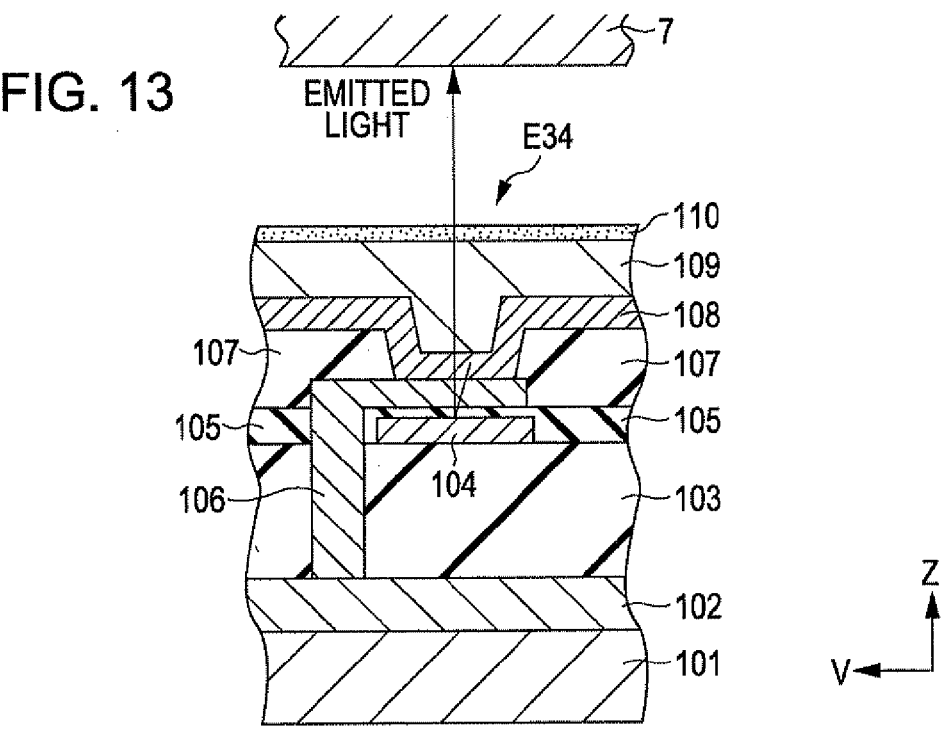
FIG. 13 is a sectional view illustrating a structure of the light emitting element.

FIG. 13 is a sectional view illustrating a structure of the light emitting element E34, and shows a case where the illumination device 4 is cut along a plane including the half line L in parallel with the Z direction.

As can be clearly seen from FIG. 13, the illumination device 4 is a top emission type. Accordingly, as a base material 101 of the light emitting element chip 22, it is possible to employ an opaque plate material such as ceramics or a metal sheet other than an optically transparent plate material such as glass. A wire layer 102 is formed on the surface of the base material 101. The wire layer 102 includes an active element (a transistor) that controls the light amount of the light emitting element E34 and a wire that transfers various signals. Further, the surface of the wire layer 102 is covered by a foundation layer 103. The foundation layer 103 is a film formed of various insulation materials such as acryl-based and epoxy-based resin materials or inorganic materials of silicon oxide (SiOx) and silicon nitride (SiNx).

A light reflective layer 104 for the light emitting element E34 is formed on the surface of the foundation layer 103. The light reflective layer 104 has a planar plate shape, and is formed of a light reflective material such as an elementary metal of aluminum, silver, or the like or a composition metal including aluminum or silver as a dominant component. The light reflective layer 104 reflects the light, which is emitted from the light emitting layer 108, toward the upper side of the drawing. The surface of the foundation layer 103 having the light reflective layer 104 formed thereon is coated with the light transmissive layer 105. The light transmissive layer 105 is a film used for protecting the light reflective layer 104, and is formed of an insulation material with optical transparency such as silicon oxide or silicon nitride.

A first electrode 106, which functions as an anode of the light emitting element E34, is formed on the surface of the light transmissive layer 105. The first electrode 106 is formed of a transparent conductive material such as ITO (indium tin oxide), ZnO (zinc oxide), or IZO (indium zinc oxide). Further, a part of the first electrode 106 is electrically connected to the wire layer 102 through a contact hole which penetrates through the light transmissive layer 105 and the foundation layer 103. Thereby, the first electrode 106 is able to supply a predetermined current to the light emitting layer 108. An insulation layer 107 is formed on the surface of the light transmissive layer 105 having the first electrode 106 formed thereon. The insulation layer 107 is an insulation film on which an opening portion (a hole which penetrates through the insulation layer 107 in the thickness direction) is formed in an area where the insulation layer 107 and the first electrode 106 overlap with each other as viewed in the Z direction.

The first electrode 106 and the insulation layer 107 are covered by a light emitting layer 108. The light emitting layer 108 includes at least the organic light emitting layer, and the organic light emitting layer is constituted of an organic EL material which emits light by the coupling between electrons and holes. The light emitting layer 108 is continuously formed throughout a plurality of light emitting elements E by a coating technique such as a spin coating method. As described above, the light emitting layer 108 is continuously formed throughout the plurality of light emitting elements E. However, the first electrode 106 is separately formed for each light emitting element E. Hence, the light amount is individually controlled for each light emitting element E in accordance with the current supplied from the first electrode 106. However, the light emitting layer 108 may be independently formed for each light emitting element E by a liquid droplet ejecting method (an ink jet method). Further, as other layers constituting the light emitting layer 108, some or all of an electron blocking layer, hole injection layer, hole transport layer, electron transport layer, electron injection layer, and hole blocking layer may be provided.

The surface of the light emitting layer 108 is covered by a second electrode 109 which functions as a cathode of the light emitting element E34. The second electrode 109 is formed of an optically transparent conductive material such as ITO. Further, the second electrode 109 is continuously formed throughout the plurality of light emitting elements E. The surface of the second electrode 109 is covered by a sealing layer 110. The light emitting layer 108 emits light with the intensity depending on the driving current which flows from the first electrode 106 to the second electrode 109. Furthermore, since current does not flow in the area where the insulation layer 107 is interposed between the first electrode 106 and the second electrode 109, the portion, in which the light emitting layer 108 and the insulation layer 107 overlap with each other, does not emit light. Accordingly, in the accumulated layers of the first electrode 106, the insulation layer 107, the light emitting layer 108, and the second electrode 109, the portion positioned inside the opening portion of the insulation layer 107 functions as the light emitting element E34.

The light, which is emitted from the light emitting layer 108 toward the second electrode 109, is transmitted through the second electrode 109 and the sealing layer 110, and is emitted to the illumination target surface. Further, as indicated by the arrow in the drawing, when the light which is emitted from the light emitting layer 108 toward the first electrode 106 is transmitted through the first electrode 106 and the light transmissive layer 105 and reaches the light reflective layer 104, the light is reflected to the upper side of the drawing by the light reflective layer 104, is transmitted through the light transmissive layer 105, the first electrode 106, the light emitting layer 108, the second electrode 109, and the sealing layer 110, and is emitted to the illumination target surface. Accordingly, the light, which is emitted from the light emitting element E34, travels in the Z direction, passes through the micro lens M34, and passes through the imaginary plane 7.

Furthermore, the light emitting elements E22 to E25, E32, E33, and E35 also have the same structure as the light emitting element E34. Accordingly, as shown in FIG. 12, the light, which is emitted from each of the light emitting elements E22 to E25 and E32 to E35, travels in the Z direction, and passes the imaginary plane 7.

Figure 14:
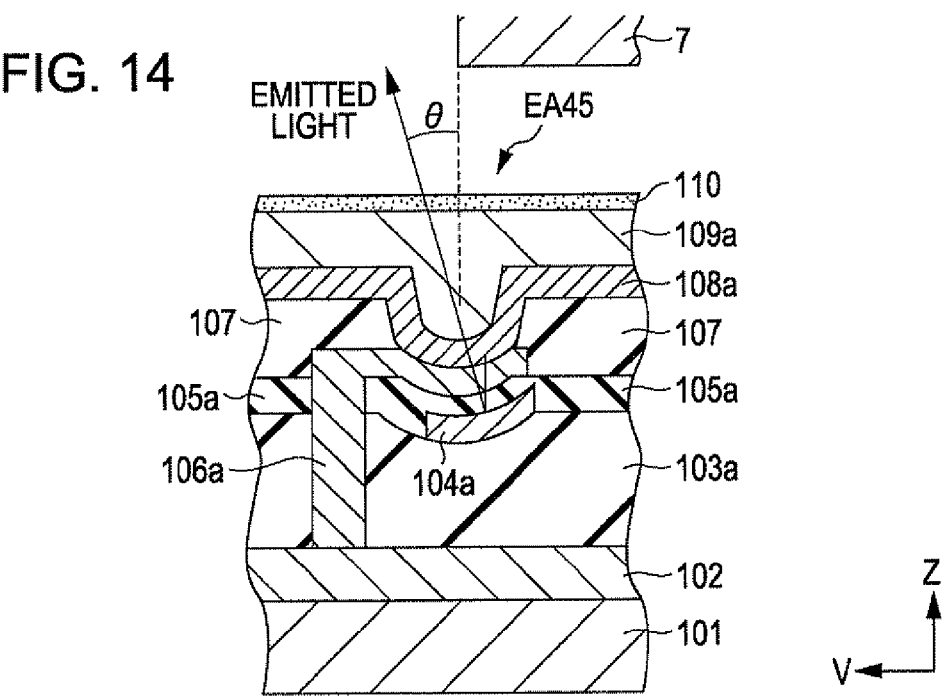
FIG. 14 is a sectional view illustrating a structure of the light emitting element.

FIG. 14 is a sectional view illustrating a structure of the light emitting element EA45, and shows a case where the illumination device 4 is cut along a plane including the half line L in parallel with the Z direction. In FIG. 14, common elements to FIG. 13 are represented by the same reference numerals and signs.

As shown in FIG. 14, a curved hollow is formed on a portion of the surface of a foundation layer 103a corresponding to the opening portion of the insulation layer 107. A light reflective layer 104a with a regular thickness is formed on a right side portion of the hollow in the drawing. Accordingly, the light reflective layer 104a is different from the light reflective layer 104 shown in FIG. 13 in that the light reflective layer 104a has a curved shape. The light reflective layer 104a is formed in a shape by which the direction of the light emitted from the light emitting element EA45 is set to be inclined at the angle θ to the Z axis in the V direction. Furthermore, in FIG. 14, there is a difference from the case of FIG. 13 not only in the light reflective layer 104a but also in the shapes of portions of a light transmissive layer 105a, a first electrode 106a, the light emitting layer 108a and a second electrode 109a, which are laminated on the light reflective layer 104a, corresponding to the hollow.

Further, although not shown in the drawings, a spacer formed of a material having a light blocking effect is disposed between the light emitting element chip 22 and the lens array unit 82. The spacer has 24 through-holes that are formed to make the light, which is emitted from each light emitting element E, incident to each micro lens ML corresponding thereto. However, the center axis of each through-hole, which connects the light emitting element EA45 to the micro lens MC45, coincides with the direction of the light reflected by the light emitting element EA45 (the light reflective layer 104a). Accordingly, the light, which is emitted from the light emitting element EA45, travels at the tilt angle θ to the Z axis in the V direction, passes through the micro lens MC45, and passes through the outside of the imaginary plane 7 without passing through the imaginary plane 7.

Furthermore, the light emitting element EA11 to EA16, EA21, EA26, EA31, EA36, EA41 to EA44, and EA46 also have the same structure as the light emitting element EA45. Accordingly, as shown in FIG. 12, the light, which is emitted from each of the light emitting elements EA11 to EA16, EA21, EA26, EA31, EA36, and EA41 to EA46, travels at the tilt angle θ to the Z axis in the direction from the center α of the light emitting area 14 to the end thereof, and passes through the outside of the imaginary plane 7 without passing through the imaginary plane 7.

As described above, according to the fourth embodiment, each light emitting element chip 22 employs the light emitting elements EA11 to EA16, EA21, EA26, EA31, EA36, and EA41 to EA46, each having a light reflective layer 104a of which the shape is different from the light reflective layer 104, as 16 second light emitting portions surrounding the 8 first light emitting portion. Thereby, the direction of the light, which is emitted from each of the second light emitting portions, is set to be inclined at the angle θ to the Z axis in the direction from the center α of the light emitting area 14 to the end thereof. Hence, it is possible to entirely diffuse the light, which is emitted from each light emitting element chip 22, outside the corresponding light emitting element chip 22.

Accordingly, as an advantage corresponding to the first issue of the invention, it is possible to irradiate a wider area by using the single light emitting element chip 22.

In addition, as an advantage corresponding to the second issue of the invention, it is possible to illuminate the entire area, which includes the area corresponding the connection portion of the four light emitting element chips 22, on the illumination target surface. As a result, the luminance of the entire area, which includes the area corresponding to the connection portion of the light emitting substrates, on the illumination target surface increases, and thus the difference between the luminance of the area and the luminance of the other area decreases. Hence, it is possible to achieve uniformity of the luminance on the illumination target surface.

Further, in the fourth embodiment, the micro lenses M arranged in the lens array 80 are limited to a single type (the non-decentered lens of which the optical center coincides with the geometric center thereof). That is, the fourth embodiment has an advantage in that it is easy to manufacture the lens array.

Furthermore, as both the space D1 and the width D3 in FIG. 11 are approximate to zero, even when the light emitting elements E for emitting light in the Z direction are used as the second light emitting portions, it is possible to achieve uniformity of the luminance on the illumination target surface. However, as described in the first embodiment, it is difficult to set the width D3 to zero. In contrast, in the fourth embodiment, similarly to the first embodiment, even when the width D3 is secured to have only a length sufficient to cut out the light emitting element chip 22, it is possible to achieve uniformity of the luminance on the illumination target surface.

E. Fifth Embodiment

Next, the illumination device 5 according to a fifth embodiment will be described. Furthermore, in the embodiment, the elements common to the fourth embodiment will be represented by the same reference numerals and signs, and a detailed description thereof will be appropriately omitted.

The illumination device 5 is different from the illumination device 4 only in that the illumination device 5 has a light emitting panel 30 instead of the light emitting panel 20. As shown in FIG. 11, the light emitting panel 30 of the illumination device 5 includes four rectangular light emitting element chips (light emitting substrates) 32. Such light emitting element chips 32 are arranged, similarly to the light emitting element chips 22, in 2 rows and 2 columns in the X and Y directions. The light emitting element chip 32 is different from the light emitting element chip 22 only in the structure of the second light emitting portions.

Figure 15:
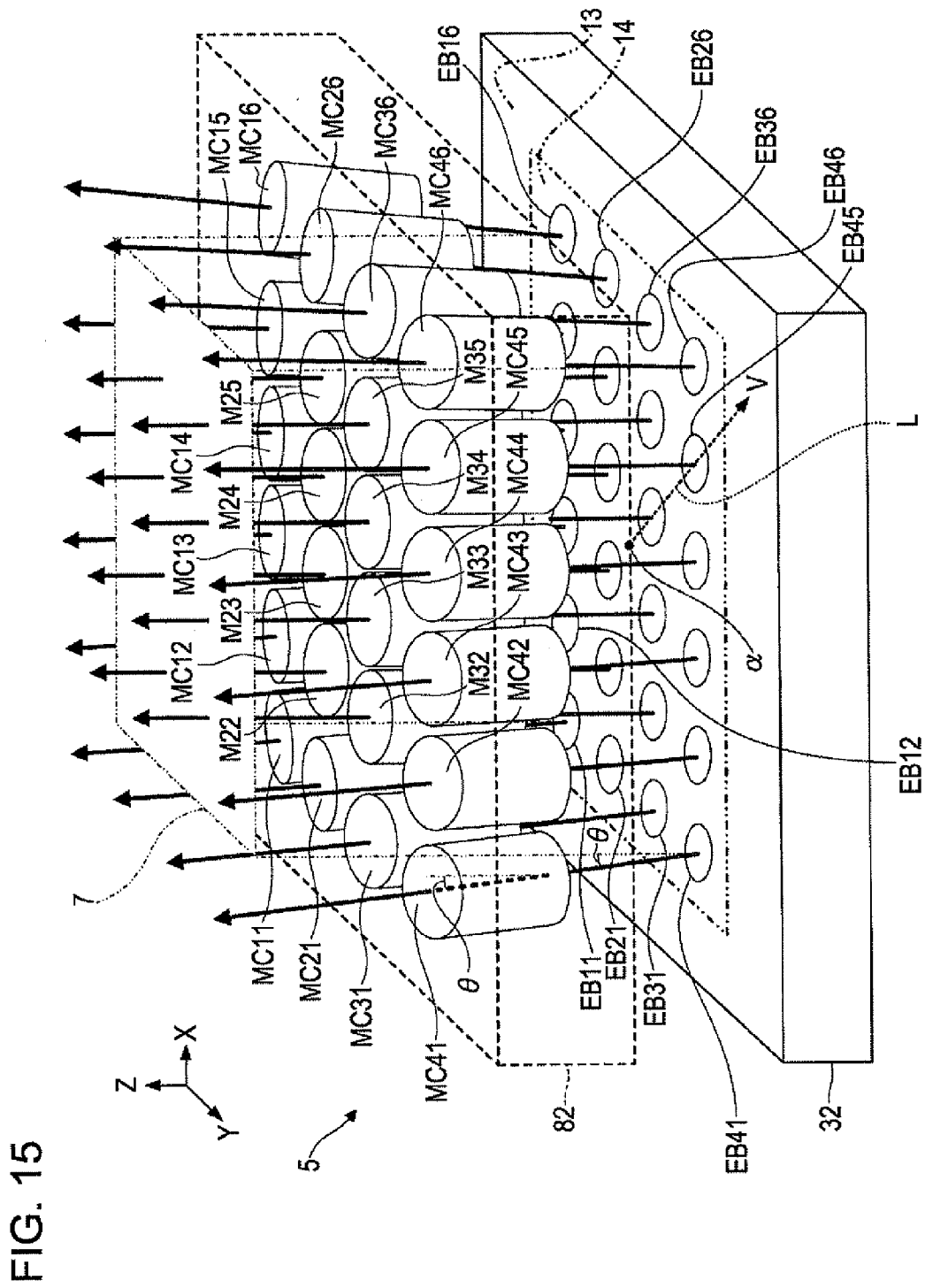
FIG. 15 is a perspective view illustrating a partial structure of the illumination device.

FIG. 15 is a perspective view illustrating a partial structure of the illumination device 5.

As can be clearly seen from FIGS. 15 and 12, each of the four light emitting element chips 32 included in the illumination device 5 has light emitting elements EB11 to EB16, EB21, EB26, EB31, EB36, and EB41 to EB46 instead of the light emitting elements EA11 to EA16, EA21, EA26, EA31, EA36, and EA41 to EA46.

Figure 16:
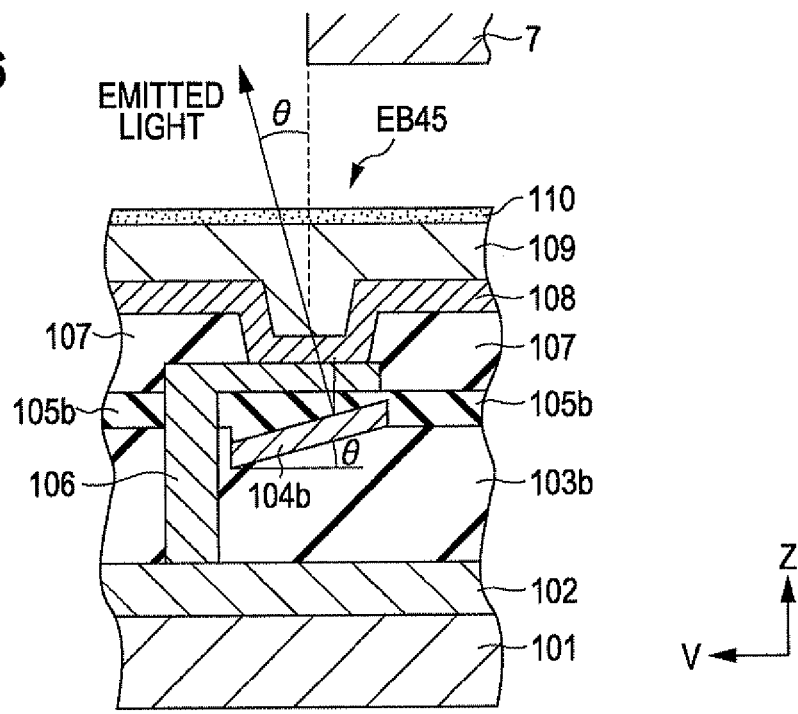
FIG. 16 is a sectional view illustrating an example of a structure of the light emitting element.

FIG. 16 is a sectional view illustrating an example of a structure of the light emitting element EB45, and shows a case where the illumination device 5 is cut along a plane including the half line L in parallel with the Z direction. In FIG. 16, common elements to FIG. 13 are represented by the same reference numerals and signs.

As shown in FIG. 16, a hollow of which the bottom face has a tilt angle of θ is formed on a portion of the surface of a foundation layer 103b corresponding to the opening portion of the insulation layer 107. In the hollow, a light reflective layer 104b, which has a planar plate shape with a regular thickness, is formed. The light reflective layer 104b is different from the light reflective layer 104 of FIG. 13 only in the angle to the light emitting layer 108. That is, the light reflective layer 104b is disposed such that the direction of the light emitted from the light emitting element EB45 is set to be inclined, with respect to the light emitting layer 108, at the angle θ to the Z axis in the V direction. Furthermore, in FIG. 16, there is a difference from the case of FIG. 13 in the shapes of portions corresponding to the hollow not only in the light reflective layer 104b but also in a light transmissive layer 105b which is laminated thereon.

Accordingly, the light, which is emitted from the light emitting element EB45, travels at the tilt angle θ to the Z axis in the V direction, passes through the micro lens MC45, and passes through the outside of the imaginary plane 7 without passing through the imaginary plane 7. Furthermore, the light emitting element EB11 to EB16, EB21, EB26, EB31, EB36, EB41 to EB44, and EB46 also have the same structure as the light emitting element EB45. Accordingly, as shown in FIG. 15, the light, which is emitted from each of the light emitting elements EB11 to EB16, EB21, EB26, EB31, EB36, and EB41 to EB46, travels at the tilt angle θ to the Z axis in the direction from the center α of the light emitting area 14 to the end thereof, and passes through the outside of the imaginary plane 7 without passing the imaginary plane 7.

As described above, according to the fifth embodiment, each light emitting element chip 32 employs the light emitting elements EB11 to EB16, EB21, EB26, EB31, EB36, and EB41 to EB46, each having a light reflective layer 104b of which the angle to the light emitting layer 108 is different from the light reflective layer 104, as 16 second light emitting portions surrounding the 8 first light emitting portion. Thereby, the direction of the light, which is emitted from each of the second light emitting portions, is set to be inclined at the angle θ to the Z axis in the direction from the center α of the light emitting area 14 to the end thereof. Hence, it is possible to entirely diffuse the light, which is emitted from each light emitting element chip 32, outside the corresponding light emitting element chip 32. Accordingly, the embodiment exhibits the same effect as the fourth embodiment.

Figure 17:
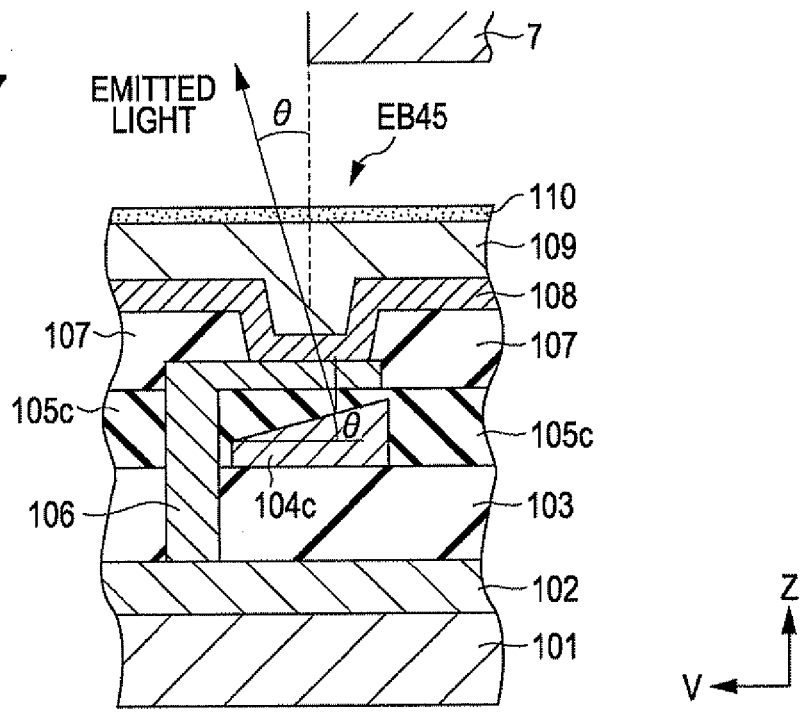
FIG. 17 is a sectional view illustrating another example of the structure of the light emitting element.

Furthermore, the structure of the second light emitting portion according to the embodiment is not limited to that shown in FIG. 16, and may be, for example, the structure shown in FIG. 17. FIG. 17 is a sectional view illustrating another example of the structure of the light emitting element EB45, and shows a case where the illumination device 5 is cut along a plane including the half line L in parallel with the Z direction. In FIG. 17, common elements to FIG. 16 are represented by the same reference numerals and signs. The structure shown in FIG. 17 is remarkably different from the structure shown in FIG. 16 in that the hollow is not formed on the surface of the foundation layer 103 and a light reflective layer 104c of which the top face has a tilt angle of θ is formed thereon. That is, instead of the foundation layer 103b, the light reflective layer 104b, and the light transmissive layer 105b, there are provided the foundation layer 103, the light reflective layer 104c, and a light transmissive layer 105c.

F. Sixth Embodiment

Next, the illumination device 6 according to a sixth embodiment will be described. Furthermore, in the embodiment, the elements common to the fourth embodiment will be represented by the same reference numerals and signs, and a detailed description thereof will be appropriately omitted.

Figure 18:
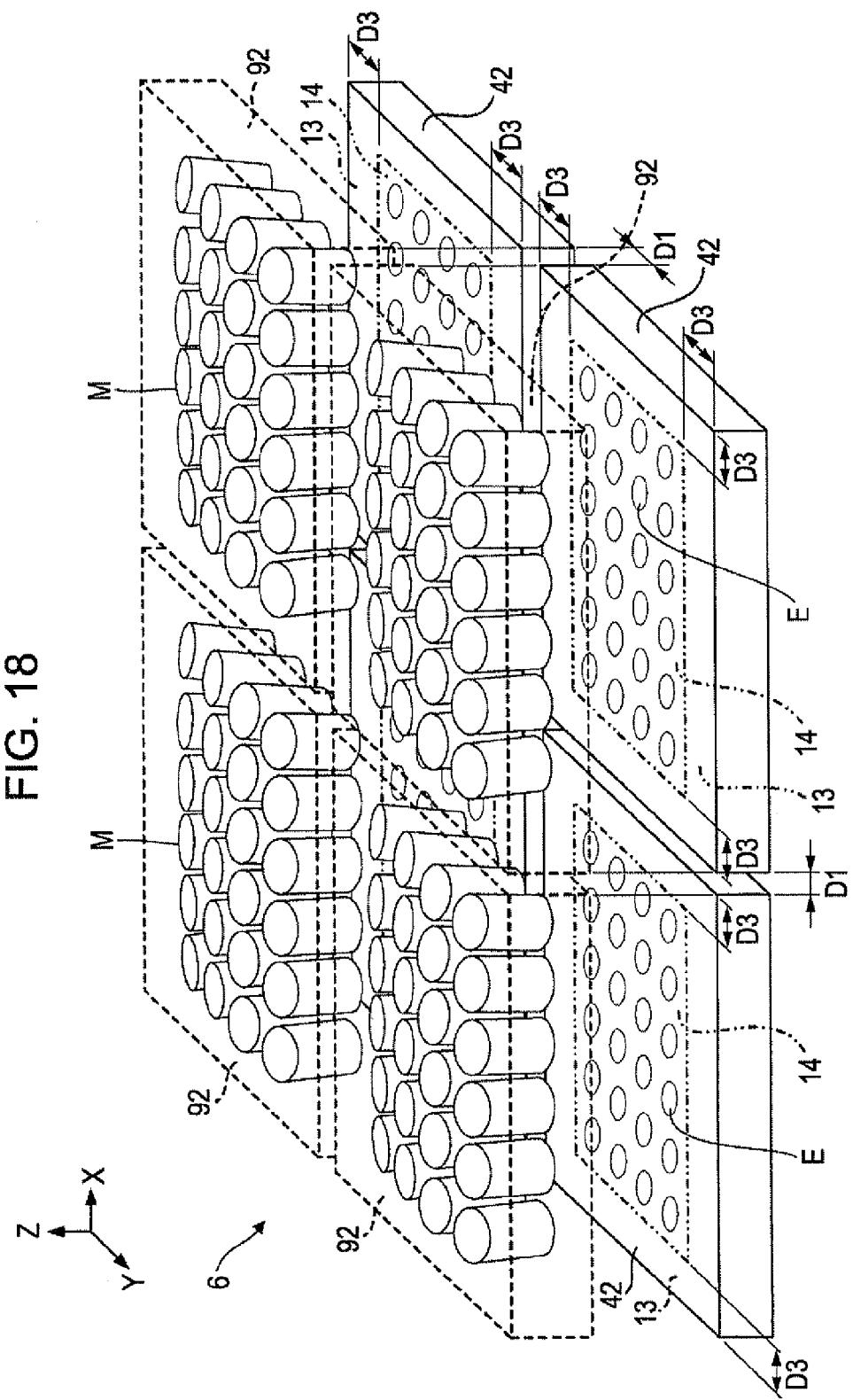
FIG. 18 is a perspective view illustrating a structure of the illumination device.

FIG. 18 is a perspective view illustrating a structure of the illumination device 6. As shown in FIG. 18, the light emitting panel 40 of the illumination device 6 includes four rectangular light emitting element chips (light emitting substrates) 42. Such light emitting element chips 42 are arranged, similarly to the light emitting element chips 22, in 2 rows and 2 columns in the X and Y directions. Further, each light emitting element chip 42 has, similarly to the light emitting element chip 22, 24 light emitting elements E which are arranged in 4 rows and 6 columns in the X and Y directions. However, the direction of light, which is emitted from each of the 96 light emitting elements E included in the illumination device 6, is inclined with respect to the Z axis.

On the other hand, the lens array 90 of the illumination device 6 includes four lens array units 92. As shown in FIG. 18, each lens array unit 92 is disposed to face the light emitting element chip 42, and has a tabular base formed of an optically transparent material (for example, glass) as indicated by the dashed line. The lens array unit 92 has, similarly to the lens array unit 82, the 24 micro lenses M (non-decentered lenses) which are arranged in 4 rows and 6 columns in the X and Y directions. However, the optical axes of the 96 micro lenses M included in the illumination device 6 are inclined with respect to the Z axis in the direction from the center α of the light emitting area 14 to the end thereof. Further, the optical axis of the micro lens M (the micro lens MDij) in the i-th row and j-th column passes through the light emitting center of the light emitting element E (the light emitting element ECij) in the i-th row and j-th column.

Figure 19:
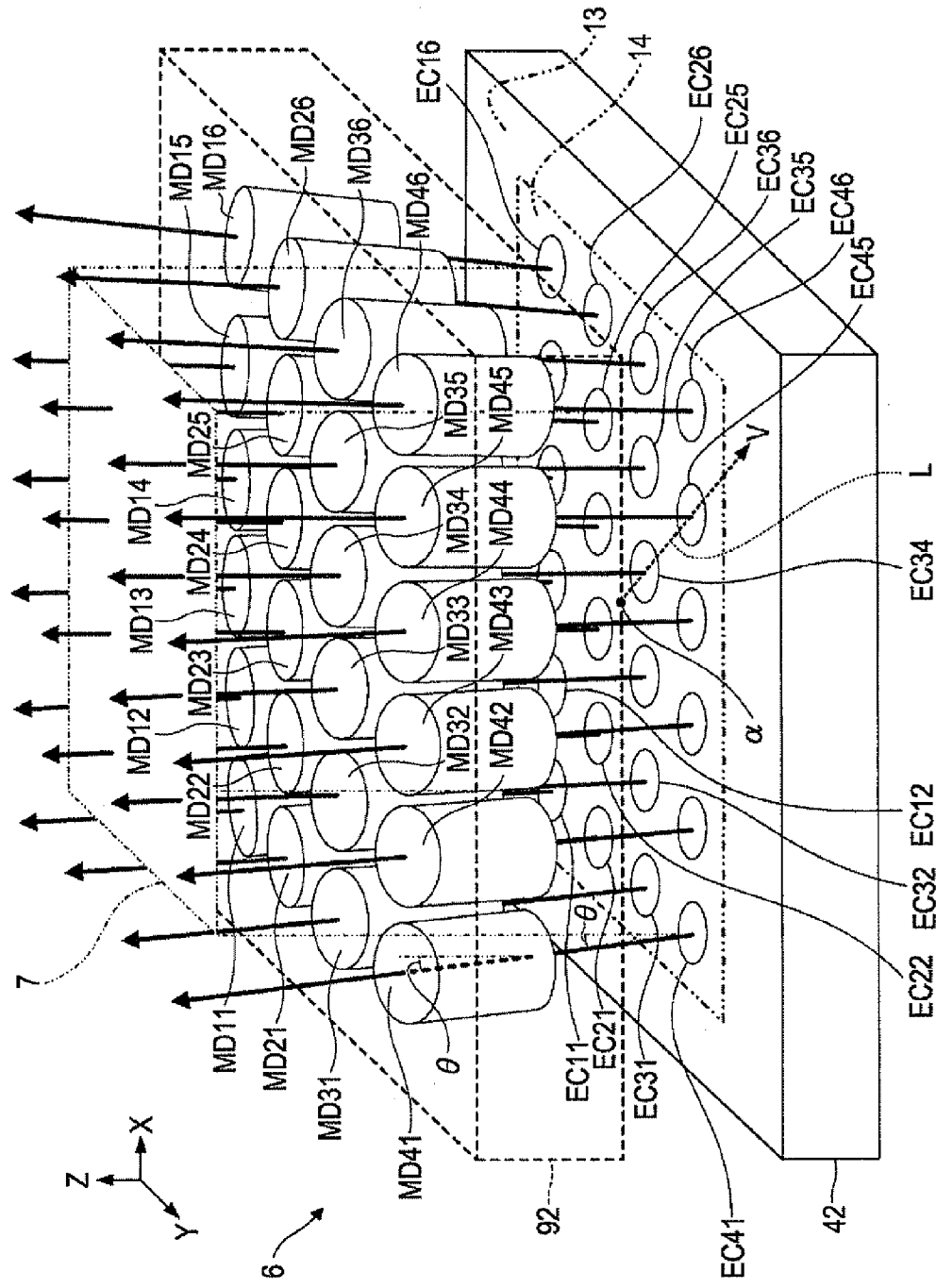
FIG. 19 is a perspective view illustrating a partial structure of the illumination device.

FIG. 19 is a perspective view illustrating a partial structure of the illumination device 6.

As shown in FIG. 19, each lens array unit 92 has, as 24 micro lenses M, the micro lenses MD11 to MD46. The angle θ, at which the optical axis of each micro lens M is inclined, to the Z axis, increases as the position of the corresponding micro lens M gets closer to the end of the light emitting area 14 from the center α thereof. For example, the optical axis of the micro lens MD34 is inclined at the angle θ=θ1 to the Z axis, and optical axis of the micro lens MD45 is inclined at the angle θ=θ2 to the Z axis. Here, θ1<θ2. Further, each light emitting element chip 42 has, as the 24 light emitting elements E, light emitting elements EC11 to EC46.

FIG. 20 is a sectional view illustrating an example of a structure of the light emitting element EC34, and FIG. 21 is a sectional view illustrating an example of a structure of the light emitting element EC45. Both of them show cases where the illumination device 6 is cut along a plane including the half line L in parallel with the Z direction. In such drawings, common elements to FIG. 14 are represented by the same reference numerals and signs. As shown in such drawings a curved hollow is formed on a portion of the surface of a foundation layer 103d (103e) corresponding to the opening portion of the insulation layer 107. A light reflective layer 104d (104e) with a regular thickness is formed on a right side portion of the hollow in the drawing. However, the light reflective layer 104*d* (104*e*) is formed in a shape by which the direction of the light emitted from the light emitting element EC34 (EC45) is set to be inclined at the angle θ=θ1 (θ2) to the Z axis in the V direction. Furthermore, there is a difference between not only the shapes of the light reflective layer 104*d* and the light reflective layer 104*e* but also the shapes of the light transmissive layer 105*d* and the light transmissive layer 105*e*.

The magnitude relation in the angle θ between the light emitting element EC34 and the light emitting element EC45, of which the light emitting centers are in the half line L, is similarly satisfied between the plurality of light emitting elements E of which the light emitting centers are in the other half lines from the center α of the light emitting area 14 as a starting point. That is, the angle θ, at which the direction of the light emitted from each light emitting element E is inclined with respect to the Z axis in the direction from the center α of the light emitting area 14 to the end thereof, increases as the position of the light emitting element E gets closer to the end of the light emitting area 14 from the center α thereof.

Further, a spacer (not shown in the drawing) formed of a material having a light blocking effect is disposed between the light emitting element chip 42 and the lens array unit 92 in FIG. 19. The spacer has 24 through-holes that are formed to make the light, which is emitted from each light emitting element E, incident to each micro lens M corresponding thereto. However, the center axis of each through-hole, which connects the light emitting element ECij in the i-th row and the j-th column to the micro lens MDij in the i-th row and the j-th column, coincides with the direction of the light reflected by the light emitting element ECij. For example, the center axis of the through-hole, which connects the light emitting element EC34 and the micro lens MD34, is inclined at the angle θ=θ1 to the Z axis in the V direction, and the center axis of the through-hole, which connects the light emitting element EC45 and the micro lens MD45, is inclined at the angle θ=θ2 to the Z axis in the V direction.

Accordingly, the light, which is emitted from each of the light emitting elements EC22 to EC25 and EC32 to EC35, travels at the tilt angle to the Z axis in the direction from the center α of the light emitting area 14 to the end thereof, and passes through the imaginary plane 7. In addition, the light, which is emitted from each of the light emitting elements EC11 to EC16, EC21, EC26, EC31, EC36, and EC41 to EC46, travels at the tilt angle to the Z axis in the direction from the center α of the light emitting area 14 to the end thereof, and passes through the outside of the imaginary plane 7 without passing through the imaginary plane 7.

As described above, according to the sixth embodiment, the angle θ, at which the direction of the light emitted from each light emitting element E is inclined with respect to the Z axis in the direction from the center α of the light emitting area 14 to the end thereof, increases as the position of the light emitting element E gets closer to the end of the light emitting area 14 from the center α thereof. Hence, it is possible to entirely diffuse the light, which is emitted from each light emitting element chip 42, outside the corresponding light emitting element chip 42. Accordingly, the embodiment exhibits the same effect as the fourth embodiment. Further, since the direction of the light, which is emitted from each light emitting element E, is set as described above, it is possible to make the illuminance on the illumination target surface more uniform.

Furthermore, the structure of the light emitting portion according to the embodiment is not limited to that shown in FIG. 20 or 21, and may be, for example, the structure shown in FIG. 16 or 17. That is, in the same manner as described in the embodiment, as the 96 light emitting portions, it may be possible to employ light emitting portions each having the light reflective layer formed in a shape by which, as the position of the light emitting portion gets closer to the end of the light emitting area 14 from the center α thereof, the slope thereof with respect to the Z axis in the direction from the center α to the end increases. Contrary to the embodiment, it may be possible to employ light emitting portions each having the light reflective layer of which the angle to the light emitting layer increases as the position of the light emitting portion gets closer to the end from the center α.

G. Modified Examples

The invention is not limited to each embodiment mentioned above, and may be modified into, for example, the following forms. Further, the above-mentioned embodiment may be appropriately and arbitrarily combined with two or more forms of the following modified examples. However, in the following description, m and n are natural numbers.

Modified Example 1

In the first and second embodiments, as the micro lenses M opposed to the light emitting elements E arranged along 1, 2 or 3 edges among the 4 edges of the light emitting element chip 12, it may be possible to employ micro lenses M each of which does not refract the traveling direction of the light which is emitted from the light emitting element E opposed to the lens. In this case, each of the plurality of light emitting elements E, which are arranged along 1 or more and 3 or less edges of the 4 edges of the light emitting element chip 12, is formed as the second light emitting portion. In addition, each of the plurality of light emitting elements E, which are not arranged along the 1 or more and 3 or less edges, is formed as the first light emitting portion. That is, the light emitting elements E, which are arranged along the edges except for the 1 or more and 3 or less edges of the 4 edges of the light emitting element chip 12, may be treated as the first light emitting portions.

For example, in the first embodiment, non-decentered lenses are employed in a total of 36 micro lenses M. The 36 micro lenses M include: 9 micro lenses M in the first row and the first column of the upper left lens array unit 52 of FIG. 2; 9 micro lenses M in the first row and the sixth column of the upper right lens array unit 52; 9 micro lenses M in the fourth row and the first column of the lower left lens array unit 52; and 9 micro lenses M in the fourth row and the sixth column of the lower right lens array unit 52. In this case, the array patterns of the second lenses are different among the light emitting element chips 12. However, there is no change in illuminating the entire area which includes the area corresponding to the connection portion of the light emitting element chips 12.

That is, in each of the plurality of light emitting substrates, the plurality of second light emitting portions may be arranged along, among all the edges of the corresponding light emitting substrate, at least the edges close to the adjacent light emitting substrates. The lenses opposed to the second light emitting portions are the second lenses. Hence, in this case, in each of the plurality of lens array units, the plurality of second lenses is arranged along, among all the edges of the opposed light emitting substrate, at least the edges close to the light emitting substrates adjacent to the corresponding light emitting substrate. With such a configuration, it is possible to diffuse the light, which is emitted from each light emitting substrate, toward at least the light emitting substrates adjacent to the corresponding light emitting substrate. Hence, it is possible to illuminate the entire area, which includes the area corresponding to the connection portion of the light emitting element chips, on the illumination target surface. However, in this configuration, the plurality of lens array units opposed to the plurality of light emitting substrates includes a lens array unit in which the second lenses are arranged in a first pattern and a lens array unit in which the second lenses are arranged in a second pattern different from the first pattern.

In contrast, in the above-mentioned first and second embodiments, in each light emitting element chip 12, each of the 16 light emitting elements E (E11 to E16, E21, E26, E31, E36, and E41 to E46), which are arranged along all the edges of the corresponding light emitting element chip 12, is formed as the second light emitting portion. Thus, the second lens opposed to each of the 16 second light emitting portions refracts the traveling direction of the light which is emitted from the opposed second light emitting portion. Hence, although the array pattern of the second lenses is common among the light emitting element chips 12, it is possible to illuminate the entire area which includes the area corresponding to the connection portion of the light emitting element chips 12.

That is, in each of the plurality of light emitting substrates, the plurality of second light emitting portions may be arranged along all the edges of the corresponding light emitting substrate. The lenses opposed to the second light emitting portions are the second lenses. Hence, in this case, in each of the plurality of lens array units, the plurality of second lenses is arranged along all the edges of the opposed light emitting substrate. With such a configuration, the light, which is emitted from each light emitting substrate, is entirely diffused outside the corresponding light emitting substrate. Hence, even when the array pattern of the second lenses is common among the lens units, it is possible to illuminate the entire area which includes the area corresponding to the connection portion of the light emitting substrates. That is, while facilitating manufacture of the lens array, it is possible to illuminate the entire area which includes the area corresponding to the connection portion of the light emitting substrates. Furthermore, in the third embodiment, the array pattern of the micro lenses M is also common among the light emitting element chips 12. Accordingly, this effect is the same as that of the third embodiment.

Further, the second light emitting portions may be arranged independently from any edge of all the edges of the light emitting substrate. However, it is necessary for the plurality of light emitting portions included in the light emitting substrate to include the first light emitting portions, which are provided in the corresponding light emitting substrate, and the second light emitting portions which are provided at the positions closer to the end portion of the corresponding light emitting substrate than the first light emitting portions. In this configuration, it is also possible to diffuse the light, which is emitted from the light emitting substrate, outside the corresponding light emitting substrate.

Modified Example 2

In the fourth and fifth embodiments, the same modification as Modified Example 1 may be performed.

For example, in the fourth embodiment, light emitting elements E, from which the light is emitted in a direction along the Z axis, are employed as a total of 36 light emitting elements E. The 36 light emitting elements E include: 9 light emitting elements E in the first row and the first column of the upper left light emitting element chip 22 of FIG. 11; 9 light emitting elements E in the first row and the sixth column of the upper right light emitting element chip 22; 9 light emitting elements E in the fourth row and the first column of the lower left light emitting element chip 22; and 9 light emitting elements E in the fourth row and the sixth column of the lower right light emitting element chip 22. However, in this case, each micro lens unit is configured such that the optical axis of the micro lens M opposed to each light emitting element E passes through the corresponding light emitting element E in parallel with the Z axis. Accordingly, the array patterns of the second lenses are different among the light emitting element chips 22. However, there is no change in illuminating the entire area which includes the area corresponding to the connection portion of the light emitting element chips 22.

As described above, in the fourth and fifth embodiment, the plurality of second light emitting portions may be arranged along, among all the edges of the light emitting substrate provided with the second light emitting portions, at least the edges close to the adjacent light emitting substrates. With such a configuration, it is possible to diffuse the light, which is emitted from each light emitting substrate, toward at least the light emitting substrate adjacent to the corresponding light emitting substrate. Hence, it is possible to illuminate the entire area which includes the area corresponding to the connection portion of the light emitting element chips, on the illumination target surface. However, in this configuration, the plurality of light emitting substrates includes a light emitting substrate in which the second light emitting portions are arranged in a first pattern and a light emitting substrate in which the second light emitting portions are arranged in a second pattern different from the first pattern.

In contrast, in the above-mentioned fourth and fifth embodiments, in each light emitting element chip, each of the 16 light emitting elements E, which are arranged along all the edges of the corresponding light emitting element chip 12, is formed as the second light emitting portion. Thus, the direction of the light which is emitted from each of the 16 second light emitting portions is inclined with respect to the Z axis. Hence, although the array pattern of the second light emitting portions is common among the light emitting element chips, it is possible to illuminate the entire area which includes the area corresponding to the connection portion of the light emitting element chips.

That is, in each of the plurality of light emitting substrates, the plurality of second light emitting portions may be arranged along all the edges of the corresponding light emitting substrate. With such a configuration, the light, which is emitted from each light emitting substrate, is entirely diffused outside the corresponding light emitting substrate. Hence, even when the array pattern of the second light emitting portions is common among the light emitting substrates, it is possible to illuminate the entire area which includes the area corresponding to the connection portion of the light emitting substrates. That is, while facilitating manufacture of the light emitting substrate and the lens array, it is possible to illuminate the entire area which includes the area corresponding to the connection portion of the light emitting substrates. Furthermore, in the sixth embodiment, the array pattern of the light emitting portions is also common among the light emitting element chips 42. Accordingly, this effect is the same as that of the sixth embodiment.

Further, the second light emitting portions may be arranged independently from any edge of all the edges of the light emitting substrate. However, it is necessary for the plurality of light emitting portions included in the light emitting substrate to include the first light emitting portions, which are provided in the corresponding light emitting substrate, and the second light emitting portions which are provided at the positions closer to the end portion of the corresponding light emitting substrate than the first light emitting portions. In this configuration, it is also possible to diffuse the light, which is emitted from the light emitting substrate, outside the corresponding light emitting substrate.

Modified Example 3

In the first embodiment, the decentered lenses are employed as the second lenses. However, the invention is not limited to this, and it may be possible to employ arbitrary lenses having a function of causing the light, which is emitted from the opposed second light emitting portion, to travel in a direction different from the original direction of the emitted light. In the same manner as described above, in the above-mentioned second embodiment, each second lens (non-decentered lens) and each second light emitting portion opposed to each other are disposed such that the optical axis of the second lens is deviated from the light emitting center of the second light emitting portion. Thereby, the light, which is emitted from the second light emitting portion, travels in a direction different from the original direction of the emitted light. However, by using a different arrangement, the light, which is emitted from the second light emitting portion, may travel in a direction different from the original direction of the emitted light. Further, in the above-mentioned third embodiment, the non-decentered lenses or the decentered lenses are employed, but the above-mentioned configuration can also be applied to these lenses.

Modified Example 4

In the fourth embodiment, as the second light emitting portions, the light emitting portions each having a light reflective layer, of which the shape is different from that of the light reflective layer of the first light emitting portions, are employed. In the fifth embodiment, the light emitting portions each having a light reflective layer, which is inclined with respect to the light emitting layer, are employed. The invention is not limited to this, and it may be possible to employ arbitrary light emitting portions from which the light is emitted in directions inclined with respect to the straight line (the Z axis) extending from the light emitting face in a direction perpendicular to the light emitting face. The above-mentioned configuration can also be applied to the sixth embodiment.

Modified Example 5

In the third embodiment, in each lens array unit 72, the angle, at which each of the 24 micro lenses M refracts the light emitted from the opposed light emitting element E in the direction from the center α of the light emitting area 14 including the corresponding light emitting element E provided therein to the end thereof, increases as the position of the opposed light emitting element E gets closer to the end of the corresponding light emitting area 14 from the center α thereof. However, generalizing this, the angle, at which each of the 24 micro lenses M refracts the light emitted from the opposed light emitting element E in the direction from the reference position of the light emitting area 14 including the corresponding light emitting element E provided therein to the end thereof, may increase as the position of the corresponding light emitting element E gets closer to the end from the reference position of the light emitting area 14.

That is, by employing the non-decentered lenses as the micro lenses M, the micro lenses M may be arranged such that, as the position of the light emitting element E opposed to each lens gets closer to the end of the light emitting area 14 from the reference position thereof, the angle of refraction increases. In addition, by employing the decentered lenses as the micro lenses M, the micro lenses M may be arranged such that the degree of eccentricity of each micro lens M increases as the position of the light emitting element E opposed thereto gets closer to the end of the light emitting area 14 from the reference position thereof.

Furthermore, the reference position is an arbitrary position within the light emitting area 14, and may not be common among the light emitting element chips 12. For example, in FIG. 2, the reference position may be set at the following points: the upper left corner of the light emitting area 14 opposed to the upper left lens array unit 52; the upper right corner of the light emitting area 14 opposed to the upper right lens array unit 52; the lower left corner of the light emitting area 14 opposed to the lower left lens array unit 52; and the lower right corner of the light emitting area 14 opposed to the lower right lens array unit 52.

Modified Example 6

In the sixth embodiment, in each light emitting element chip 42, the angle, at which the direction of the light emitted from each of the 24 light emitting elements E is inclined with respect to the Z axis, increases as the position of the light emitting element E gets closer to the end of the light emitting area 14 from the center α thereof. However, generalizing this, the angle, at which the direction of the light emitted from each of the 24 light emitting elements E is inclined with respect to the Z axis, may increase as the position of the light emitting element E gets closer to the end of the light emitting area 14 from the reference position thereof. That is, the light emitting elements E may be arranged such that, as the position of each light emitting element E gets closer to the end of the light emitting area 14 from the reference position thereof, the slope to the Z axis increases.

Furthermore, the reference position is an arbitrary position within the light emitting area 14, and may not be common among the light emitting element chips 42. For example, in FIG. 18, the reference position may be set at the following points: the upper left corner of the light emitting area 14 of the upper left light emitting element chip 42; the upper right corner of the light emitting area 14 of the upper right light emitting element chip 42; the lower left corner of the light emitting area 14 of the lower left light emitting element chip 42; and the lower right corner of the light emitting area 14 of the lower right light emitting element chip 42.

Modified Example 7

In the first embodiment, the first lenses and the second lenses may have the same or different radii of curvature of the lens portions. Furthermore, when the radius of curvature of the lens portion of each second lens is set to be large, it is possible to further drastically refract the light which is emitted from the opposed second light emitting portion. This is the same in the second embodiment.

Further, in the third embodiment, the radii of curvature of the lens portions may be the same or different among the micro lenses M. Furthermore, as the radius of curvature of each lens portion is set to be larger, it is possible to more drastically refract the light which is emitted from the opposed light emitting portion. Hence, in each lens array unit 72, the radius of curvature of the lens portion of each micro lens M may be set to become larger as the position of the opposed light emitting element E gets closer to the end of the light emitting area 14 from the center α thereof.

Modified Example 8

In the second embodiment, the incident-side lens portion and the exit-side lens portion of each second lens may have different radii of curvature. For example, the radius of curvature of the exit-side lens portion can be set to be smaller than the radius of curvature of the incident-side lens portion. This is the same in the case of using the non-decentered lenses in the third embodiment.

Modified Example 9

In the embodiments, the base of the lens array may not be divided for each lens array unit. That is, the lens array may have a single base, which is provided at the position opposed to the four light emitting element chips, and the 24 micro lenses M may be provided in each area of the base opposed to each of the four light emitting element chips. Further, the lens array may be suitable for the configuration in which the space other than the array portion of the micro lenses M is filled with the resin having a light blocking effect.

Modified Example 10

In the embodiments, not 24 light emitting elements E but a plurality of light emitting elements E of which the number is arbitrary may be included in a single light emitting element chip. This also means that the array of the light emitting elements E of each light emitting element chip is not limited to 4 rows and 6 columns. When the single light emitting element chip has m×n light emitting elements E with m rows and n columns, the lens array unit opposed to the light emitting element chip has m×n micro lenses M with m rows and n columns. Furthermore, here, in the case of m=1, n>1, and in the case of n=1, m>1. That is, a plurality of light emitting elements E may be provided in the single light emitting element chip.

Modified Example 11

In the embodiments, the number of the light emitting element chips provided in the light emitting panel may be an arbitrary number other than 4. This also means that the array of the light emitting element chips in the light emitting panel is not limited to 2 rows and 2 columns. For example, the number of the light emitting element chips provided in the light emitting panel may be one. In this case, it is also possible to entirely diffuse the light, which is emitted from the light emitting element chip, outside the corresponding light emitting element chip. Furthermore, when the light emitting panel has m×n light emitting element chips arranged in m rows and n columns, the lens array has m×n lens array units arranged in m rows and n columns.

Modified Example 12

In the embodiments, the light emitting element E is not limited to an organic light-emitting diode element, and may be an LED element, an inorganic EL element, a plasma light emitting element, or the like. Further, the light emitting element E may be a voltage-driving element which is driven by applying a voltage. Further, when the light emitting face of the light emitting element E has a shape other than a circular shape, it is preferable to make the weighted center thereof coincide with the light emitting center of the light emitting element E. Further, the space D1 between the light emitting element chips or the arrangement space of the light emitting elements E may not be constant (equidistant). Further, the light emitting panel may not be a top emission type, but may be a bottom emission type.

Modified Example 13

In the embodiments, the plurality of light emitting elements E are provided at the position opposed to one micro lens M, and one light emitting portion may be constituted of the plurality of light emitting elements E. In this case, it is preferable to make the center (the weighted center) of the plurality of light emitting elements E constituting the one light emitting portion coincide with the light emitting center of the light emitting portion.

H. Application Example

As applications of the illumination devices according to the embodiments and modified examples, not only general indoor or outdoor illumination but also a back light or a front light of a liquid crystal device, a front light of the electrophoretic apparatus, and the like can be exemplified. Here, a description will be given of an electronic apparatus using a liquid crystal device 9 in which any one of the illumination devices 1 to 6 is employed as a back light or a front light. Furthermore, the liquid crystal device 9 includes not only the illumination device but also a plurality of liquid crystal elements arranged on the illumination target surface of the illumination device.

Figure 22:
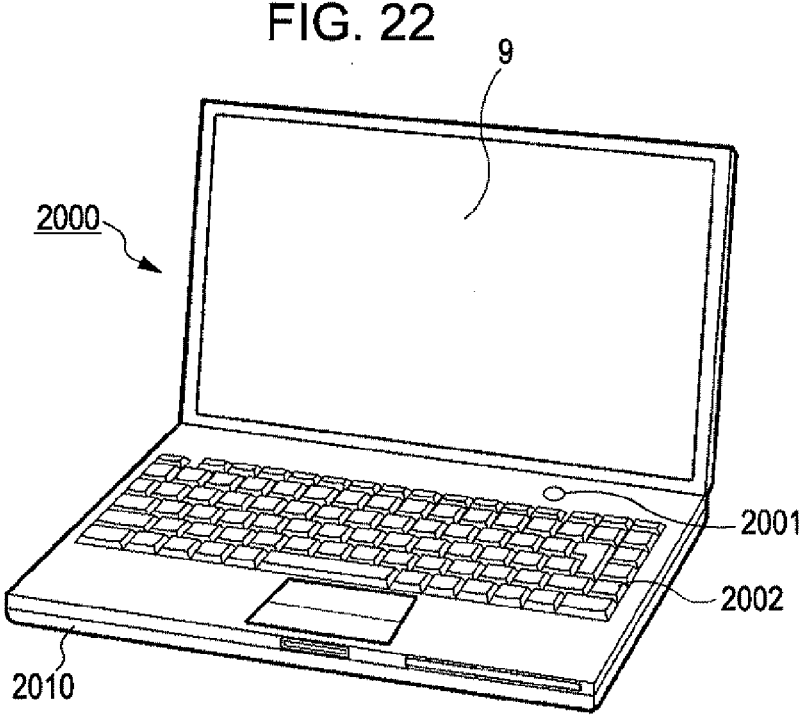
FIG. 22 is a perspective view illustrating an example of an electronic apparatus according to an embodiment of the invention.

FIG. 22 is a perspective view illustrating a configuration of a mobile type personal computer using the liquid crystal device 9 as a display device. The personal computer 2000 includes the liquid crystal device 9 and a main body 2010. The main body 2010 includes a power switch 2001 and a keyboard 2002.

Figure 23:
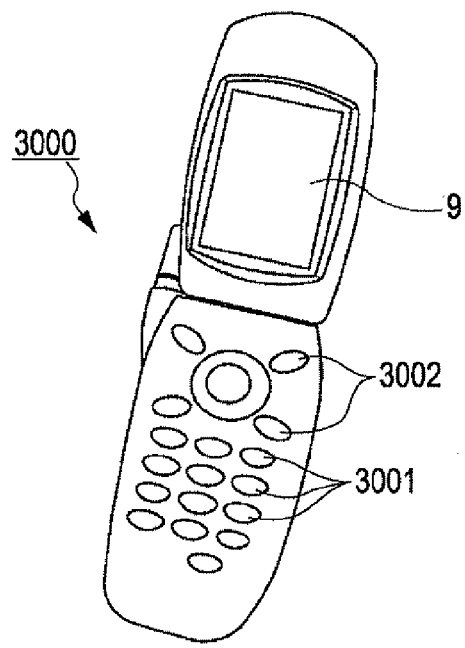
FIG. 23 is a perspective view illustrating another example of the electronic apparatus according to an embodiment of the invention.

FIG. 23 shows a configuration of a mobile phone using the liquid crystal device 9 as a display device. The mobile phone 3000 includes a plurality of operation buttons 3001 and scroll buttons 3002, and the liquid crystal device 9 as a display device. By operating the scroll buttons 3002, the screen displayed on the liquid crystal device 9 is scrolled.

Figure 24:
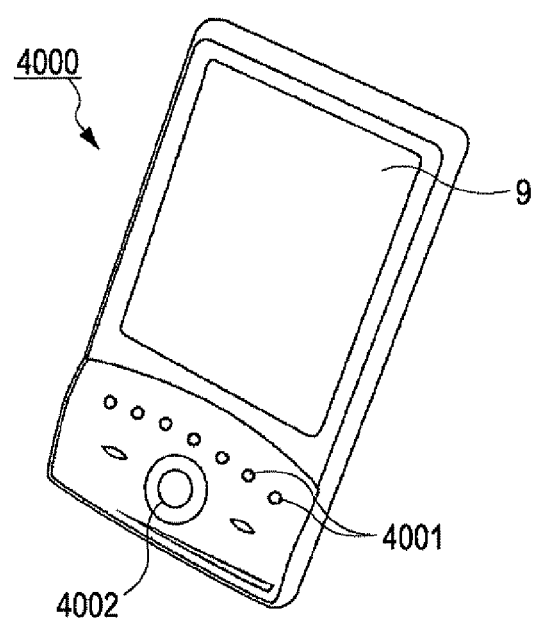
FIG. 24 is a perspective view illustrating still another example of an electronic apparatus according to an embodiment of the invention.

FIG. 24 shows a configuration of a portable information terminal (PDA: Personal Digital Assistants) employing the liquid crystal device 9 as a display device. The portable information terminal 4000 includes a plurality of operation buttons 4001 and a power switch 4002, and the liquid crystal device 9 as a display device. When the power switch 4002 is operated, various kinds of information such as an address book and a schedule notepad are displayed on the liquid crystal device 9.

Furthermore, examples of electronic apparatuses using the liquid crystal device according to the aspect of the invention include not only the electronic apparatuses shown in FIGS. 22 to 24 but also: a digital still camera; a television; a video camera; a car navigation system; a pager; an electronic personal organizer; an electronic paper; an electronic calculator; a word processor; a workstation; a video telephone; a POS terminal; a printer; a scanner; a copier; a video player; a device with a touch panel; and the like.

This application claims priority from Japanese Patent Application No. 2010-104711 filed in the Japanese Patent Office on Apr. 30, 2010 and Japanese Patent Application No.

2010-104963 filed in the Japanese Patent Office on Apr. 30, 2010, the entire disclosure of which is hereby incorporated by reference in its entirely.

What is claimed is:

1. An illumination device comprising:
a light emitting substrate that has a plurality of light emitting portions arranged thereon; and
a lens array that has a plurality of lenses each of which is opposed to each of the plurality of light emitting portions and through which passes the light emitted from the opposed light emitting portions,
wherein the plurality of light emitting portions includes a first light emitting portion which is provided on the light emitting substrate and a second light emitting portion which is provided to be closer to an end portion of the light emitting substrate than the first light emitting portion,
wherein the plurality of lenses includes a first lens which is opposed to the first light emitting portion and a second lens which is opposed to the second light emitting portion,
wherein an optical center of the first lens coincides with a geometric center thereof, and
wherein an optical center of the second lens is different from a geometric center thereof.

2. The illumination device according to claim 1,
wherein in the first light emitting portion and the first lens opposed to each other, a light emitting center of the first light emitting portion coincides with an optical axis of the first lens, and
wherein the second lens has a degree of eccentricity which is set to refract light emitted from the opposed second light emitting portion in a direction from a center of an array of the plurality of light emitting portions to an end thereof.

3. An illumination device comprising:
a light emitting substrate that has a plurality of light emitting portions arranged thereon; and
a lens array that has a plurality of lenses each of which is opposed to each of the plurality of light emitting portions of the light emitting substrate and through which passes the light emitted from the opposed light emitting portions,
wherein the plurality of light emitting portions includes a first light emitting portion which is provided on the light emitting substrate and a second light emitting portion which is provided to be closer to an end portion of the light emitting substrate than the first light emitting portion,
wherein the plurality of lenses includes a first lens which is opposed to the first light emitting portion and a second lens which is opposed to the second light emitting portion,
wherein in the first light emitting portion and the first lens opposed to each other, a light emitting center of the first light emitting portion coincides with an optical axis of the first lens, and
wherein in the second light emitting portion and the second lens opposed to each other, a light emitting center of the second light emitting portion is deviated from an optical axis of the second lens.

4. The illumination device according to claim 3,
wherein an optical center of each of the plurality of lenses coincides with a geometric center thereof, and
wherein the second light emitting portion and the second lens opposed to each other are disposed in a state where the light emitting center of the second light emitting portion is deviated from the optical axis of the second lens such that light emitted from the second light emitting portion is refracted in a direction from a center of an array of the plurality of light emitting portions to an end thereof.

5. An illumination device comprising:
a light emitting substrate that has a plurality of light emitting portions arranged thereon; and
a lens array that has a plurality of lenses each of which is opposed to each of the plurality of light emitting portions and through which passes the light emitted from the opposed light emitting portions,
wherein in each lens opposed to each of the plurality of light emitting portions, as a position of each opposed light emitting portion gets closer to an end of an array of the plurality of light emitting portions from a reference position thereof, an angle, at which the lens refracts light emitted from the opposed light emitting portion in a direction from the reference position to the end, increases.

6. An illumination device comprising:
a light emitting substrate that has a plurality of light emitting portions arranged thereon; and
a lens array that has a plurality of lenses each of which is opposed to each of the plurality of light emitting portions and through which passes the light emitted from the opposed light emitting portions,
wherein each of the plurality of light emitting portions has a light emitting layer which produces light, a light reflective layer which reflects light produced from the light emitting layer, and a light emitting face from which the light reflected by the light reflective layer is emitted,
wherein the plurality of light emitting portions includes a first light emitting portion which is provided on the light emitting substrate and a second light emitting portion which is provided to be closer to an end portion of the light emitting substrate than the first light emitting portion,
wherein a direction of light emitted from the first light emitting portion coincides with a straight line which extends from the light emitting face of the first light emitting portion in a direction perpendicular to the light emitting face, and
wherein a direction of light emitted from the second light emitting portion is inclined with respect to a straight line which extends from the light emitting face of the second light emitting portion in a direction perpendicular to the light emitting face.

7. The illumination device according to claim 6, wherein in the second light emitting portion, an angle of the light reflective layer to the light emitting layer is set such that the direction of the emitted light is inclined in a direction from a center of an array of the plurality of light emitting portions to an end thereof with respect to the straight line which extends from the light emitting face of the second light emitting portion in the direction perpendicular to the light emitting face.

8. The illumination device according to claim 6,
wherein a plurality of the light emitting substrates is provided,
wherein the plurality of light emitting substrates are two-dimensionally arranged,
wherein the plurality of light emitting portions, which belongs to each of the plurality of light emitting substrates, includes a plurality of the second light emitting portions, and
wherein in each of the plurality of light emitting substrates, the plurality of second light emitting portions is disposed along at least an adjacent edge of the corresponding light emitting substrate close to the light emitting substrate among all edges thereof.

9. An electronic apparatus comprising the illumination device according to claim 1.

10. An electronic apparatus comprising the illumination device according to claim 2.

11. An electronic apparatus comprising the illumination device according to claim 3.

12. An electronic apparatus comprising the illumination device according to claim 4.

13. An electronic apparatus comprising the illumination device according to claim 5.

14. An electronic apparatus comprising the illumination device according to claim 6.

15. An electronic apparatus comprising the illumination device according to claim 7.

16. An electronic apparatus comprising the illumination device according to claim 8.

* * * * *